US012235689B2

(12) United States Patent
Lin et al.

(10) Patent No.: US 12,235,689 B2
(45) Date of Patent: Feb. 25, 2025

(54) CABLE ARRANGEMENT MECHANISM

(71) Applicant: Quanta Computer Inc., Taoyuan (TW)

(72) Inventors: Shih-Wei Lin, Taoyuan (TW); Chih-Cheng Chu, Taoyuan (TW); Jui Hsien Huang, Taoyuan (TW); Kuo-Huan Wei, Taoyuan (TW); Ping-Hou Lin, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 57 days.

(21) Appl. No.: 18/466,935

(22) Filed: Sep. 14, 2023

(65) Prior Publication Data
US 2024/0256002 A1 Aug. 1, 2024

(30) Foreign Application Priority Data
Jan. 31, 2023 (TW) .................. 112200838

(51) Int. Cl.
*G06F 1/16* (2006.01)
(52) U.S. Cl.
CPC .................. *G06F 1/1683* (2013.01)
(58) Field of Classification Search
CPC .................................................. G06F 1/1683
See application file for complete search history.

(56) References Cited

U.S. PATENT DOCUMENTS

| | | | | |
|---|---|---|---|---|
| 4,961,126 A * | 10/1990 | Suzuki | ............ | G06F 1/1679 235/145 R |
| 4,986,763 A * | 1/1991 | Boyle | ............ | G06F 1/1635 439/165 |
| 5,394,297 A * | 2/1995 | Toedter | ............ | G06F 1/1681 174/136 |
| 5,751,544 A * | 5/1998 | Song | ............ | G06F 1/1681 439/165 |
| 6,223,393 B1 * | 5/2001 | Knopf | ............ | G06F 1/1681 16/386 |
| 8,593,800 B2 * | 11/2013 | Asakura | ............ | G06F 1/1681 361/679.28 |
| 8,931,141 B2 * | 1/2015 | Chen | ............ | G06F 1/1681 16/366 |
| 11,079,810 B2 * | 8/2021 | Bir | ............ | G06F 1/1616 |
| 11,169,579 B2 * | 11/2021 | Peng | ............ | G06F 1/1616 |
| 2004/0109286 A1 * | 6/2004 | Shin | ............ | G06F 1/1616 343/702 |

(Continued)

*Primary Examiner* — Adrian S Wilson
(74) *Attorney, Agent, or Firm* — McClure, Qualey & Rodack, LLP

(57) ABSTRACT

A cable arrangement mechanism is provided, which is disposed inside the housing of an electronic device. The cable arrangement mechanism includes a first tube, a second tube, and a plurality of first resilient elements. The first tube includes a first base, a first extension connected to the first base and extending from a first inner surface, and a first extrusion connected to the first base and extending from a first outer surface. The second tube includes a second base, a second extension connected to the second base and extending from a second inner surface, and a second extrusion connected to the second base and extending from a second outer surface. The first resilient elements respectively connect the first extrusion and the second extrusion to the housing, so that the first tube and the second tube are rotatably connected to the housing.

10 Claims, 24 Drawing Sheets

(56) References Cited

U.S. PATENT DOCUMENTS

2005/0239520 A1* 10/2005 Stefansen ........... H04M 1/0243
　　　　　　　　　　　　　　　　　　　　　　　　　455/575.1
2019/0169896 A1* 6/2019 Regimbal ................. E05D 7/04

* cited by examiner

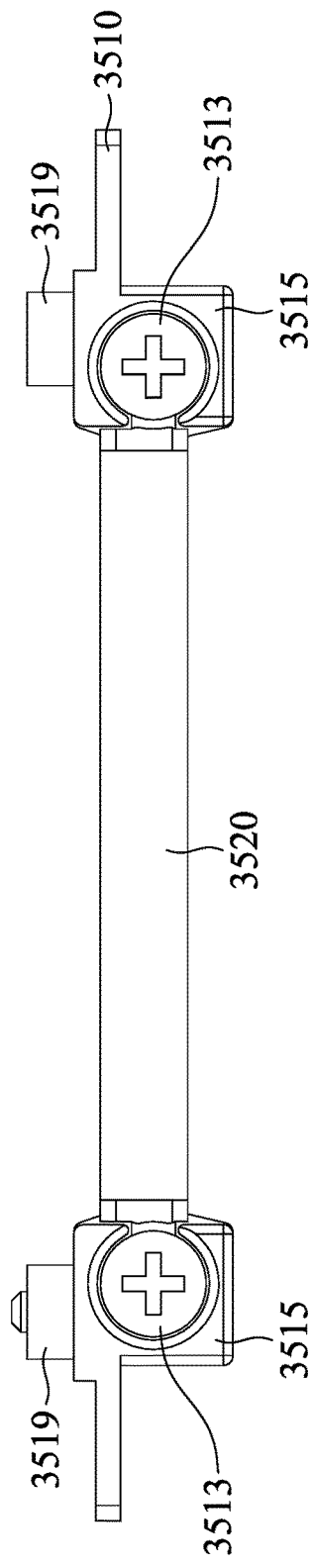
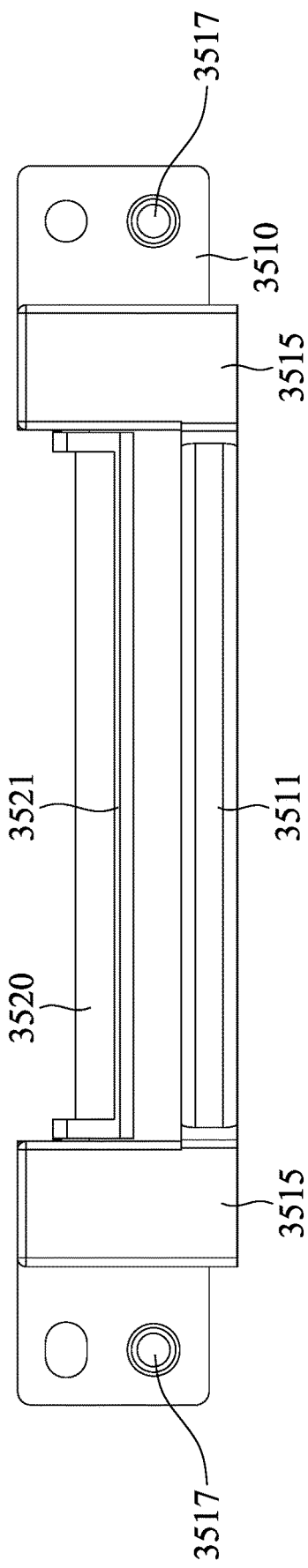
FIG. 12A
FIG. 12B

CABLE ARRANGEMENT MECHANISM

CROSS REFERENCE TO RELATED APPLICATIONS

This application claims priority of Taiwan Patent Application No. 112200838, filed on Jan. 31, 2023, the entirety of which is incorporated by reference herein.

BACKGROUND OF THE INVENTION

Field of the Invention

The present disclosure relates to a cable arrangement mechanism, and more particularly to a cable-arranging tube structure.

Description of the Related Art

In some electronic devices (e.g. notebook computers, etc.), due to the development of lighter and thinner designs, flexible printed circuits (FPCs) are often used as the circuit inside display screens. Additionally, the flexible printed circuits must pass through the pivot between the upper housing (e.g. the display screen, etc.) and the lower housing (e.g. the motherboard, etc.).

As shown in FIGS. 1A and 1B, the electronic device 1000 of the prior art includes an upper housing 1100 and a lower housing 1200. The upper housing 1100 is rotatable relative to the lower housing 1200, and thus it is able to open and close the electronic device 1000. The FPC 1300 extends from the inside of the upper housing 1100 into the lower housing 1200.

The left side of FIG. 1A shows the closed state of the electronic device 1000, and the right side shows the open state of the electronic device 1000. At the pivot between the upper housing 1100 and the lower housing 1200, the FPC 1300 leaves the upper housing 1100 from an opening at the lower part of the upper housing 1100 and enters the lower housing 1200. When the upper housing 1100 opens and closes repeatedly, there is a height difference 61 between the positions of this opening. This height difference 61 causes the FPC 1300 to form a stress concentration point S at the opening. This makes the FPC 1300 susceptible to damage such as breakage.

Similarly, the left side of FIG. 1B shows the electronic device 1000 in the closed state, and the right side shows the electronic device 1000 in the open state. The location of the opening of the upper housing 1100 in FIG. 1B is different from that in FIG. 1A. When the upper housing 1100 opens and closes repeatedly, there is a height difference 62 between the positions of this opening. This height difference 62 causes the FPC 1300 to form a stress concentration point S at the opening. This also makes the FPC 1300 susceptible to damage such as breakage.

In addition, the left side of FIG. 1C shows the electronic device 1000' in the closed state, and the right side shows the electronic device 1000' in the open state. When the upper housing 1100 opens and closes repeatedly, the opening in FIG. 1C is shown to maintain a similar height, but the FPC 1300 inside the upper housing 1100 still has a height difference 63 at its bent section. A stress concentration point S is formed at this bent section. Thus, the FPC 1300 shown in FIG. 1C is still susceptible to breakage.

Moreover, the electronic device 1000' further includes a cable-collecting device 1500 for receiving an unexpectedly bent, overly bent, or crinkled FPC 1300 caused by opening and closing the upper housing 1100. Generally, a cable-collecting device 1500 may be connected to the printed circuit board (PCB) or the like in the lower housing 1200. The cable-collecting device 1500 may include a fixed portion 1510, a cable-winding rod 1520, and a resilient element 1530. The cable-winding rod 1520 has a curved surface that is in contact with the FPC 1300. The cable-winding rod 1520 is slidable relative to the fixed portion 1510 along the horizontal direction via the resilient element 1530. As a result, for accommodating the FPC 1300, when the upper housing 1100 is in the open state, the cable-winding rod 1520 may provide extra cable-winding route for the FPC 1300. When the upper housing 1100 is in the closed state, the cable-winding rod 1520 may slide and release the FPC 1300. However, this type of the cable-collecting device 1500 requires a longer stroke (e.g. longer than 5 mm, etc.). Also, it can only be disposed under the printed circuit board. This is disadvantageous to lightening and thinning the electronic device 1000'.

Therefore, how to provide a cable arrangement mechanism that can solve the breakage problem of the flexible printed circuit and achieves a lighter and thinner design has become an important issue.

BRIEF SUMMARY OF THE INVENTION

A cable arrangement mechanism is provided, which is disposed inside a housing of an electronic device, wherein the cable arrangement mechanism includes a first tube, a second tube, and a plurality of first resilient elements. The first tube includes a first base having a first outer surface and a first inner surface opposite to the first outer surface, a first extension connected to the first base and extending from the first inner surface, and a first extrusion connected to the first base and extending from the first outer surface. The second tube includes a second base having a second outer surface and a second inner surface opposite to the second outer surface, a second extension connected to the second base and extending from the second inner surface, and a second extrusion connected to the second base and extending from the second outer surface. The first resilient elements respectively connect the first extrusion and the second extrusion to the housing, so that the first tube and the second tube are rotatably connected to the housing. The first inner surface and the second inner surface are facing each other, and the first extension and the second extension are disposed between the first base and the second base. The first extension is connected to the second base and the second extension is connected to the first base, so that the first tube and the second tube are engaged. There is an accommodating space between the first extension and the second extension.

In some embodiments, the first tube has a first locating hole on the first inner surface of the first base. The second tube has a first connecting portion on a first surface of the second extension. The second tube is connected to the first base at the first surface. The first connecting portion corresponds to the first locating hole.

In some embodiments, the second tube has a second locating hole on the second inner surface of the second base. The first tube has a second connecting portion on a second surface of the first extension. The first tube is connected to the second base at the second surface. The second connecting portion corresponds to the second locating hole.

In some embodiments, the first tube further has a hook portion on the second surface. The first extension is connected to the second base at the second surface. The second base further has a dented portion that is dented on its outer periphery. The hook portion corresponds to the dented portion.

In some embodiments, the hook portion has a third surface, facing the second surface and in contact with the second outer surface of the second base.

In some embodiments, the first extrusion and the second extrusion each has a step portion for securing one of the ends of the first resilient elements.

In some embodiments, the cable arrangement mechanism further includes a cable-collecting device. The cable-collecting device comprises: a fixed portion, a cable-winding rod, and a plurality of second resilient elements. The fixed portion is fixedly connected to the housing. The cable-winding rod is slidable relative to the fixed portion. The cable-winding rod is slidably connected to the fixed portion via the second resilient elements.

In some embodiments, the fixed portion and the cable-winding rod each comprises a rod structure. The extending directions of the rod structures are parallel to the extending directions of the first extension and the second extension.

In some embodiments, the fixed portion further includes a plurality of secure pins, respectively corresponding to one of the second resilient elements. Each of the secure pins respectively passes through one of the second resilient elements. The cable-winding rod has an opening on each of the two opposite ends of the rod structure. Each of the secure pins respectively passes through one of the openings.

In some embodiments, the fixed portion has an accommodating portion on each of the two opposite ends of the rod structure, for accommodating the openings of the cable-winding rod, the second resilient elements, and the secure pins.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIGS. 12A and 12B respectively illustrate a front view and a top view of the cable-collecting device, according to some embodiments of the present disclosure.

DETAILED DESCRIPTION OF THE INVENTION

Figure 1A:
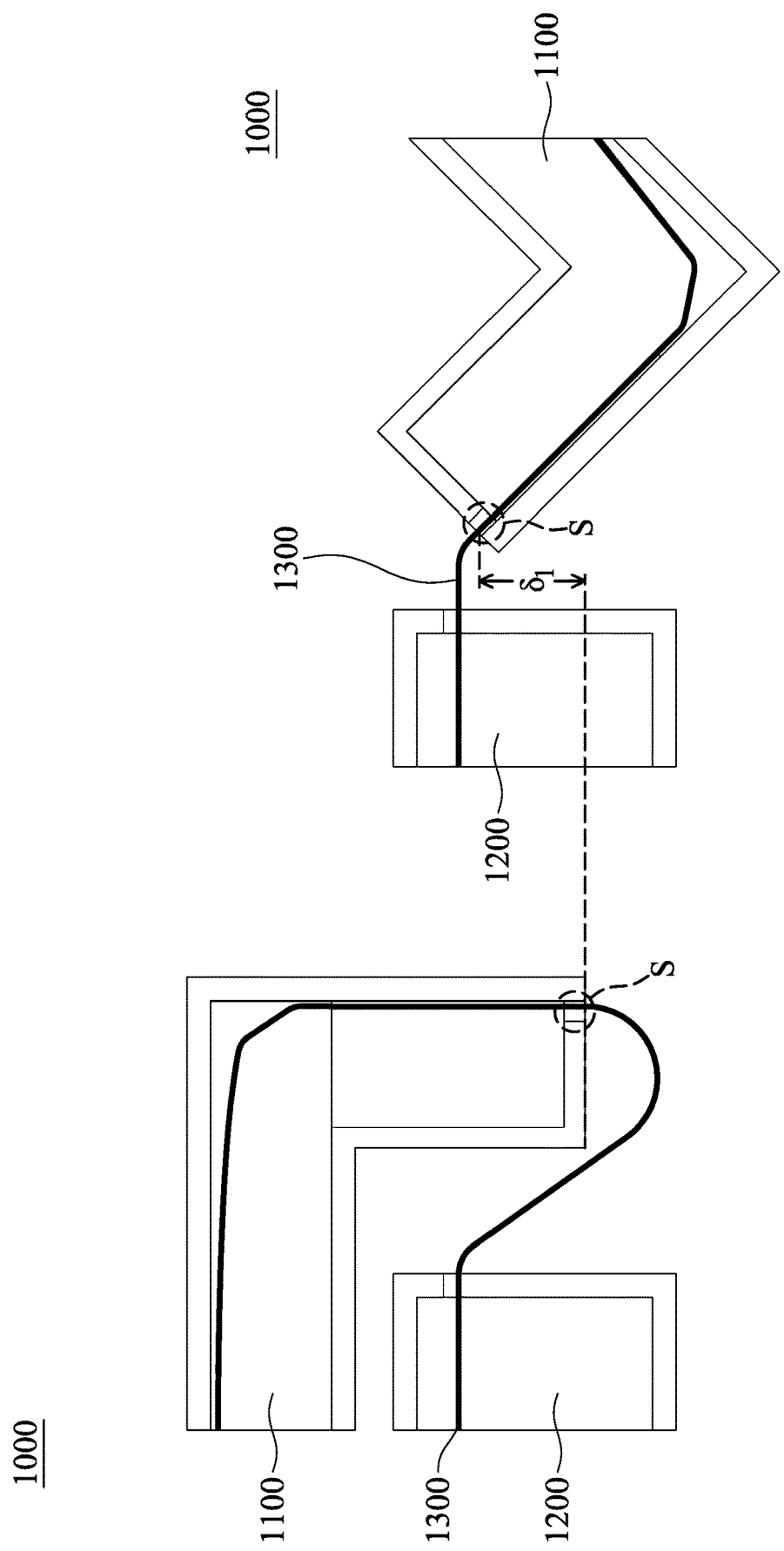
FIGS. 1A to 1C respectively illustrate cross-sectional side views of different electronic devices of the prior art in their open states and closed states.
Figure 1B:
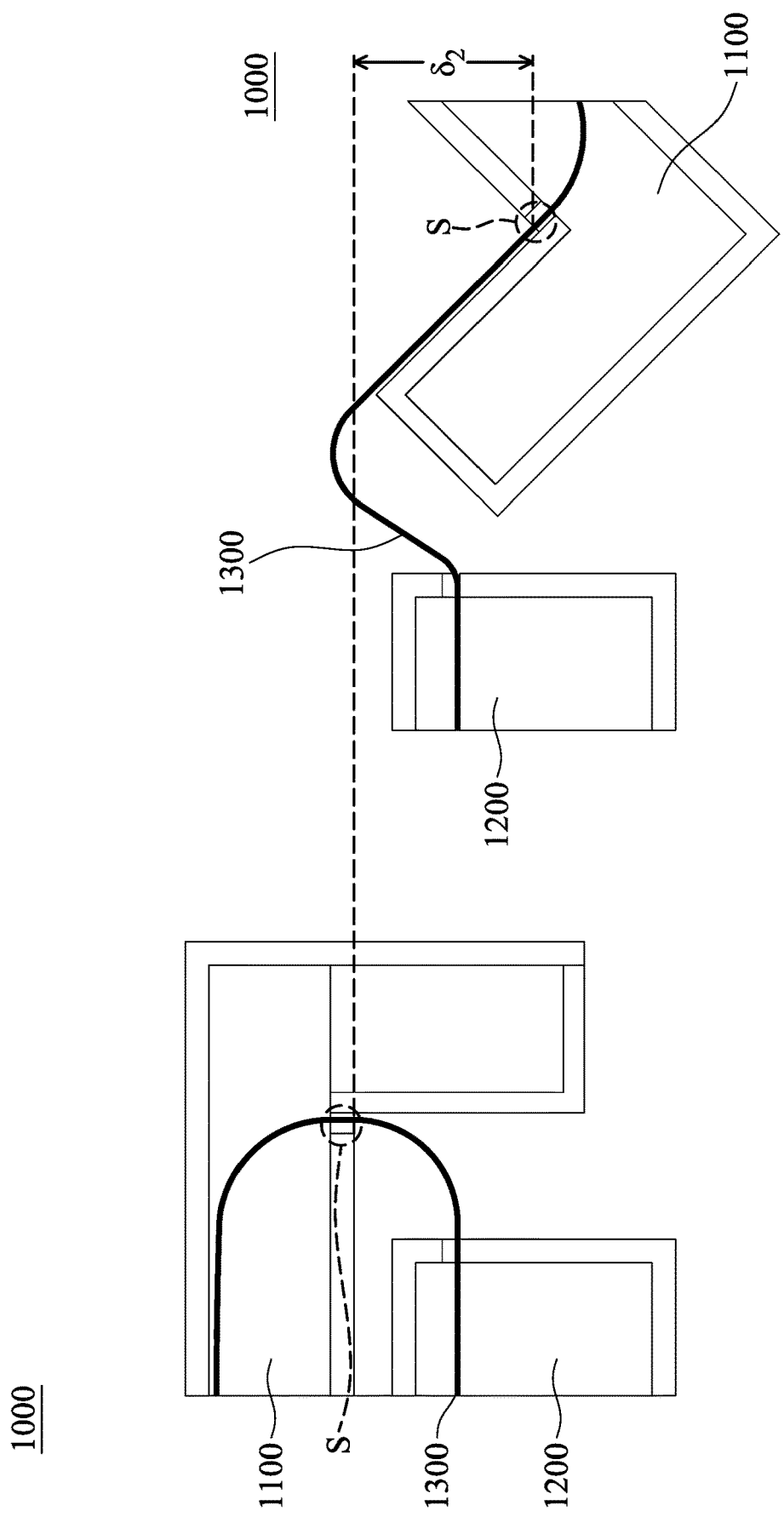
Figure 1C:
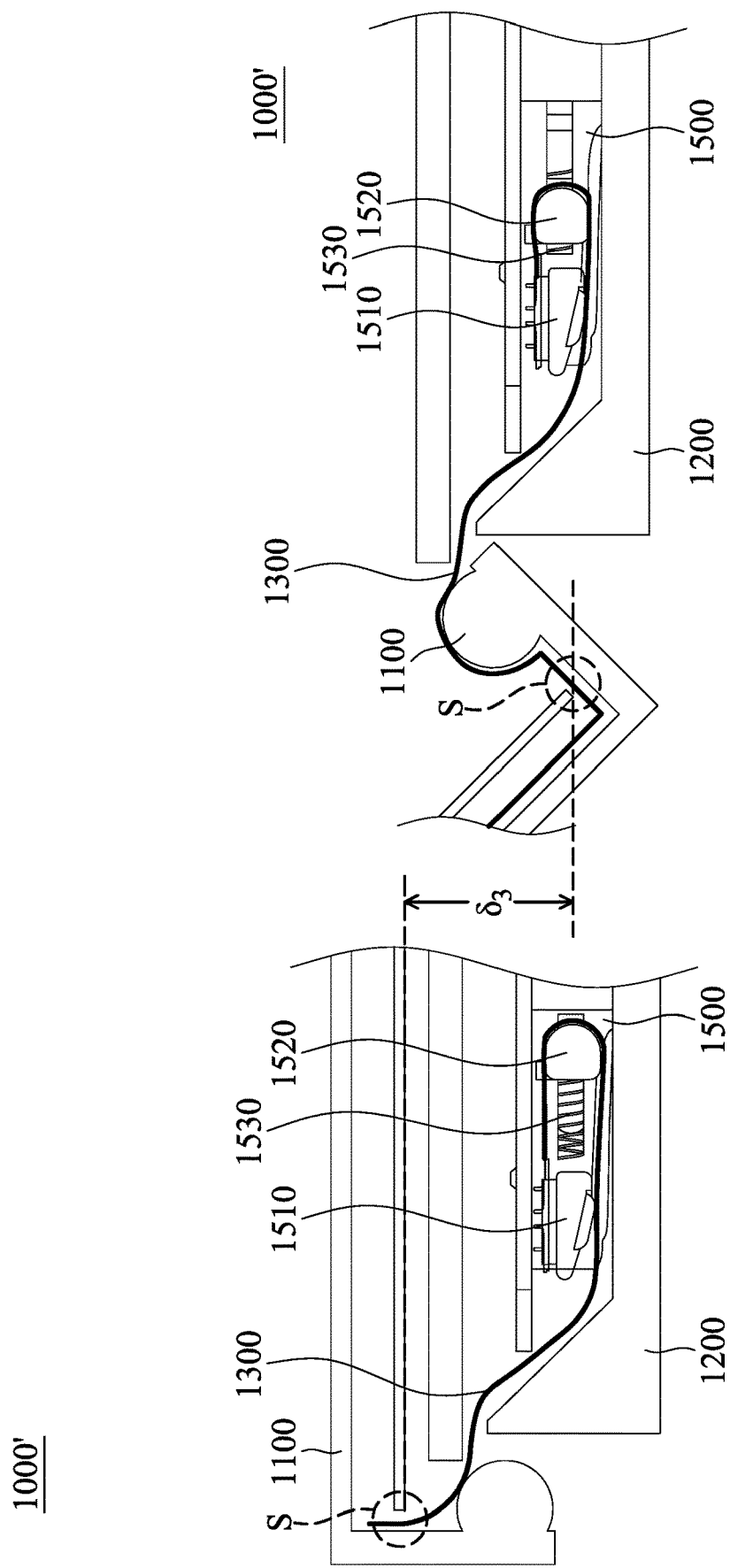

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

Figure 2:
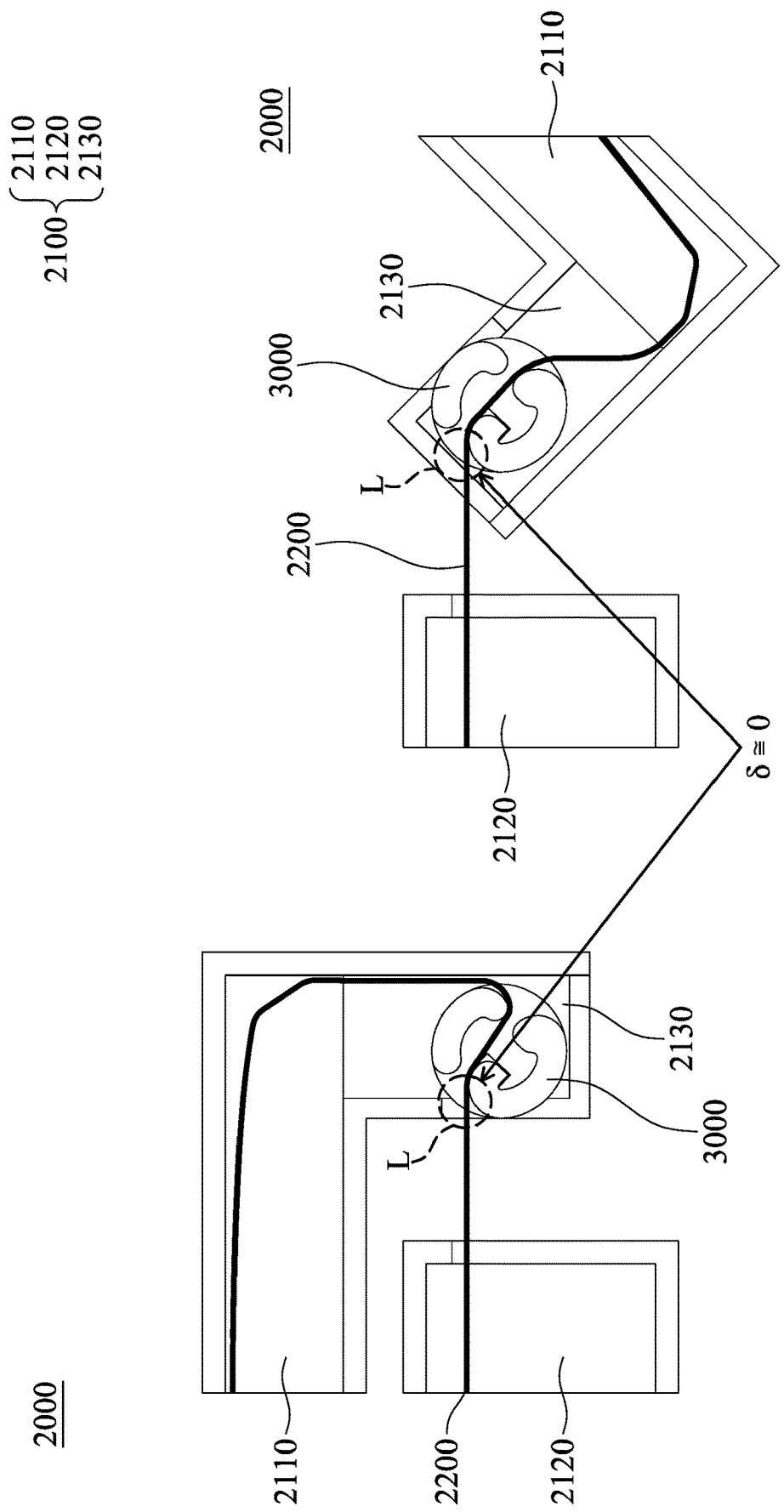
FIG. 2 illustrates cross-sectional side views of the electronic device in its open state and closed state, according to some embodiments of the present disclosure.

Referring to FIG. 2, FIG. 2 illustrates cross-sectional side views of the electronic device 2000 in its open state and closed state, according to some embodiments of the present disclosure. As shown in FIG. 2, a cable arrangement mechanism 3000 is provided in the present disclosure, disposed inside the housing 2100 of the electronic device 2000.

Specifically, the housing 2100 may include an upper housing 2110, a lower housing 2120, and a pivot cover 2130. The cable arrangement mechanism 3000 may be disposed in the pivot cover 2130 between the upper housing 2110 and the lower housing 2120. In the embodiment shown in FIG. 2, the pivot cover 2130 is connected to the upper housing 2110. However, in other embodiments, the pivot cover 2130 may be connected to the lower housing 2120 instead.

As shown in FIG. 2, the FPC 2200 passes through the tube-shaped cable arrangement mechanism 3000 that is rotatable relative to the housing 2100. When the upper housing 2110 opens and closes repeatedly, the position of the outlet L of the FPC 2200 substantially stays unchanged. This reduces the height difference S significantly, so that the height difference S is close to zero. As a result, the risk of breaking the FPC 2200 due to the repeated bending is reduced. The detailed structure of the cable arrangement mechanism 3000 will be described below.

Figure 3A:
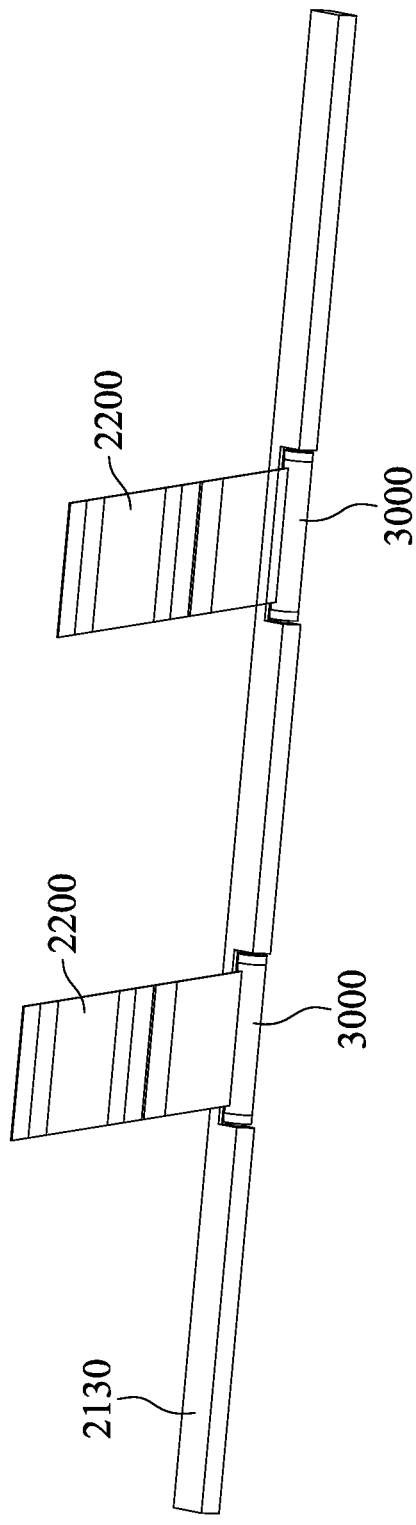
FIGS. 3A and 3B respectively illustrate a front view and a rear view of the assembled cable arrangement mechanism, flexible printed circuit, and housing, according to some embodiments of the present disclosure.
Figure 3B:
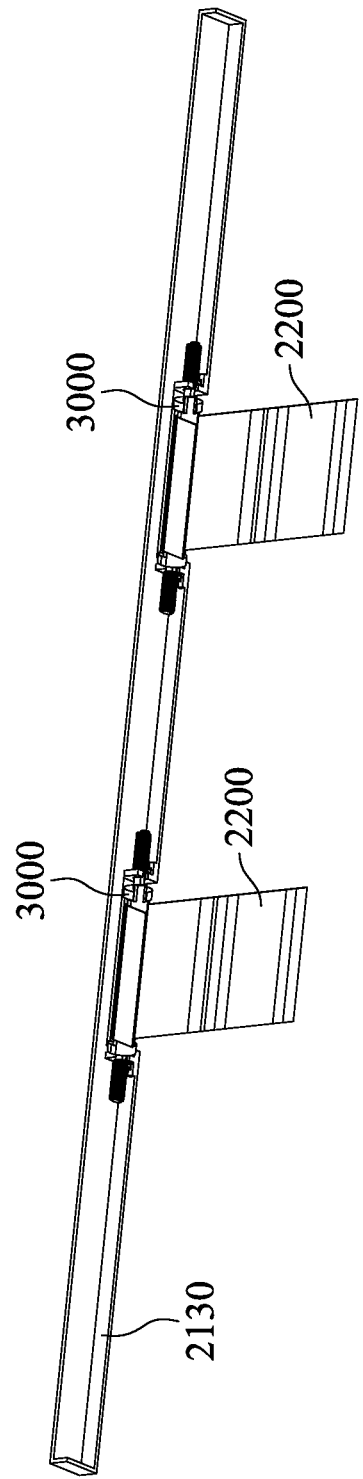

Referring to FIGS. 3A and 3B, FIGS. 3A and 3B respectively illustrate a front view and a rear view of the assembled cable arrangement mechanism 3000, FPC 2200, and pivot cover 2130, according to some embodiments of the present disclosure. In FIGS. 3A and 3B, the FPC 2200 that is connected to the cable arrangement mechanism 3000 is shown in the state where the upper housing 2110 is open. As shown, the cable arrangement mechanism 3000 is disposed inside the pivot cover 2130. The cable arrangement mechanism 3000 may be partially exposed in the front view. In some embodiments, the electronic device 2000 may include one or more cable arrangement mechanisms 3000, depending on the amount and size of the FPC 2200. In the embodiments according to the present disclosure, the electronic device 2000 may include two cable arrangement mechanisms 3000, and two cable arrangement mechanisms 3000 are separated at a certain distance.

Figure 4:
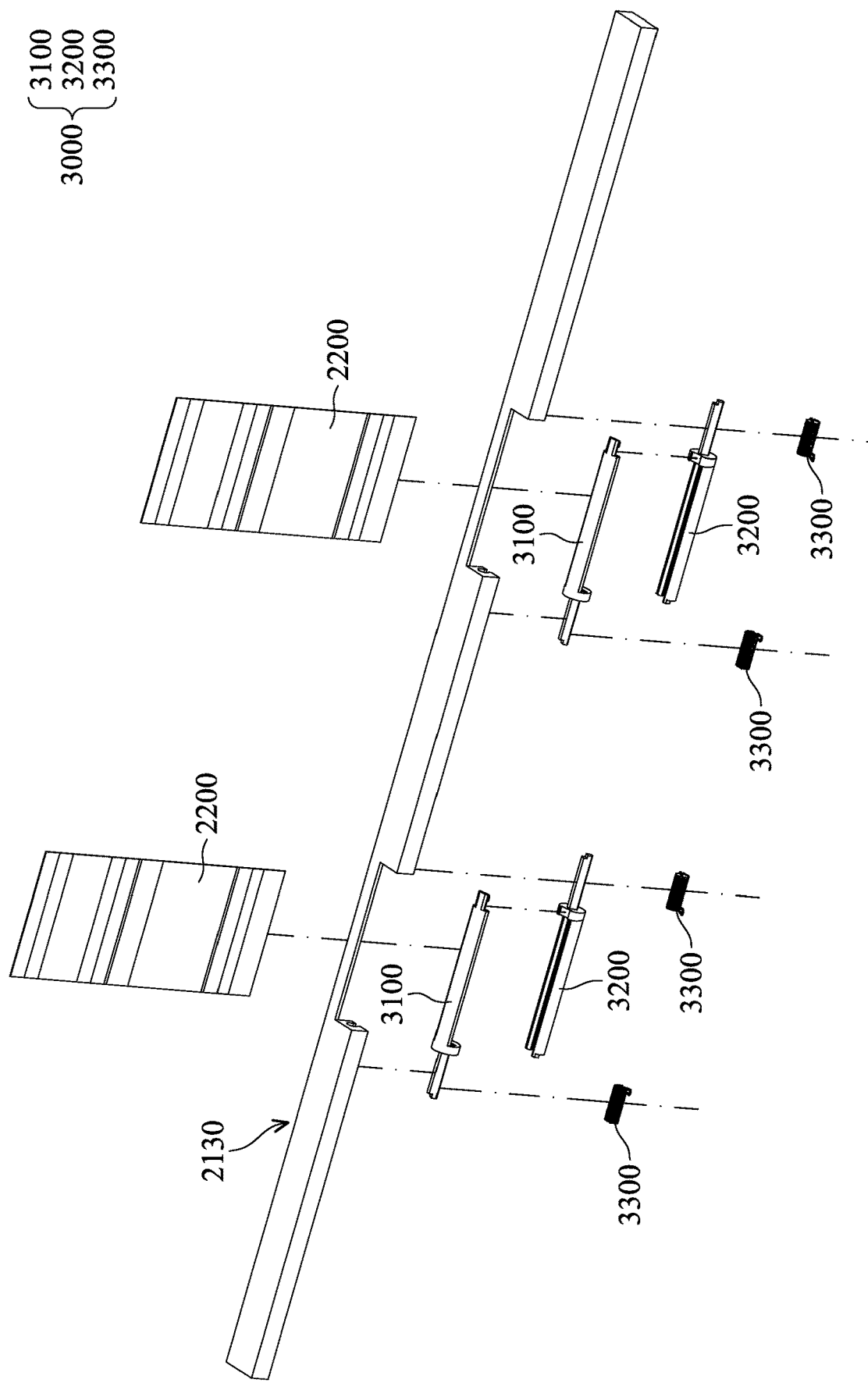
FIG. 4 illustrates an exploded view of the cable arrangement mechanism, the flexible printed circuit, and the housing, according to some embodiments of the present disclosure.

Referring to FIG. 4, FIG. 4 illustrates an exploded view of the cable arrangement mechanism 3000, the FPC 2200, and the pivot cover 2130, according to some embodiments of the present disclosure. In the embodiments according to the present disclosure, the two cable arrangement mechanisms 3000 have substantially the same structures. As shown in FIG. 4, each of the cable arrangement mechanism 3000 mainly includes a first tube 3100, a second tube 3200, and a plurality of first resilient elements 3300. The first tube 3100 and the second tube 3200 may be fixedly connected. The FPC 2200 may be held between the first tube 3100 and the second tube 3200. The engaged first tube 3100 and second tube 3200 may be connected to the pivot cover 2130 via the first resilient elements 3300. Through the elastic restoring forces provided by the first resilient elements 3300, the engaged first tube 3100 and the second tube 3200 are rotatable relative to the pivot cover 2130. This is advantageous for maintaining the position of the outlet L of the FPC 2200. The detailed structures of the first tube 3100 and the second tube 3200 will be described below.

Figure 5:
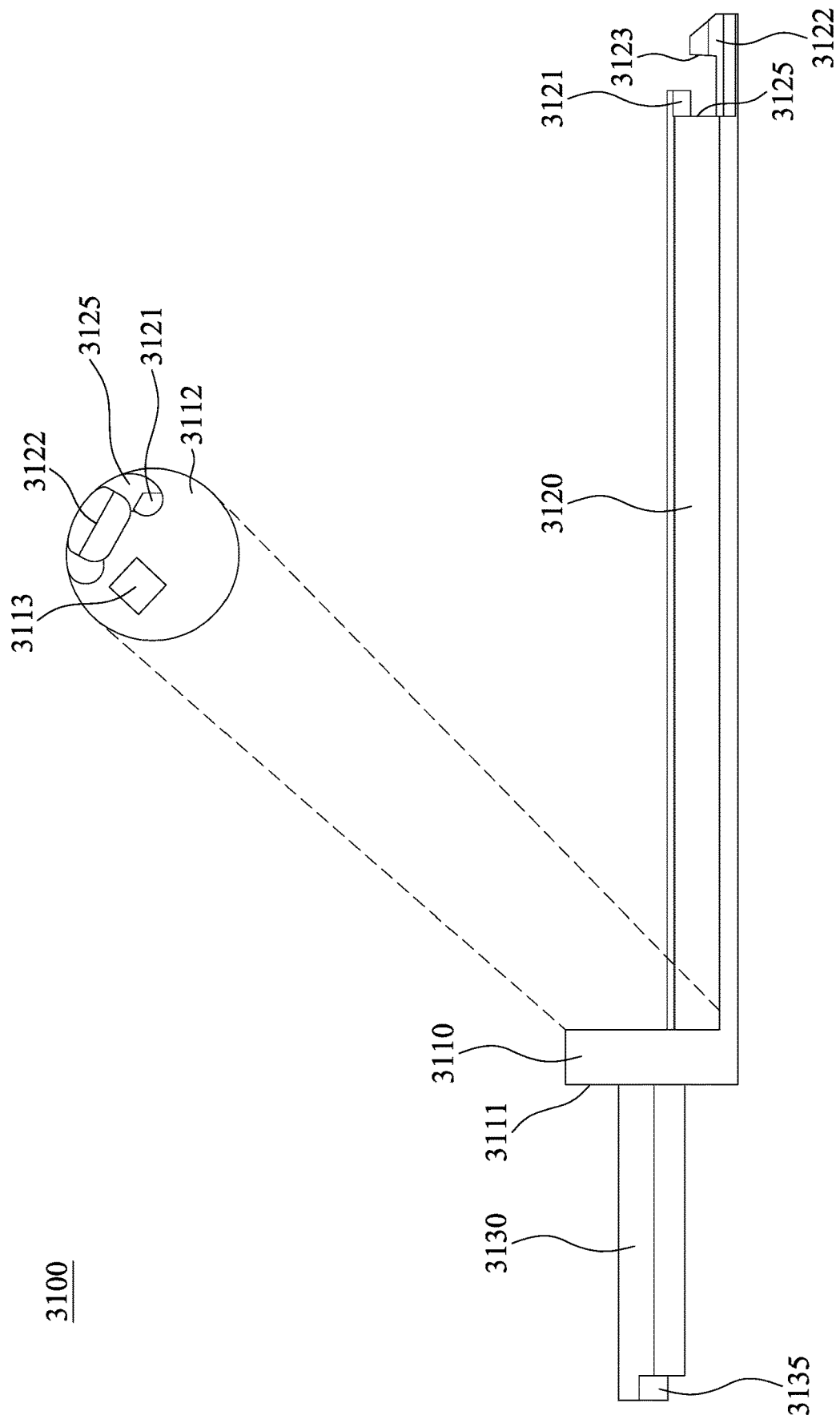
FIG. 5 illustrates a front view and a side view of the first tube, according to some embodiments of the present disclosure.
Figure 6:
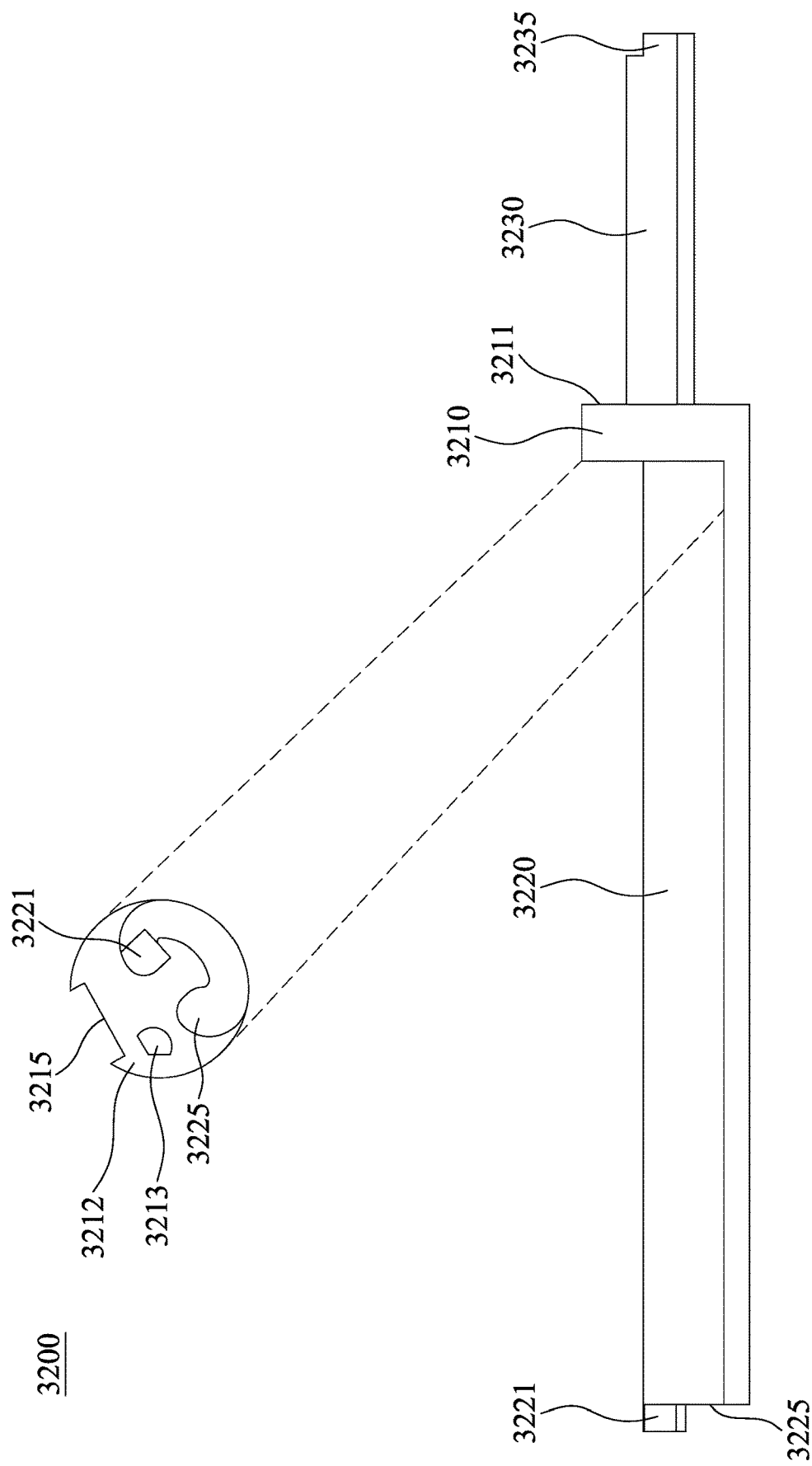
FIG. 6 illustrates a front view and a side view of the second tube, according to some embodiments of the present disclosure.
Figure 7:
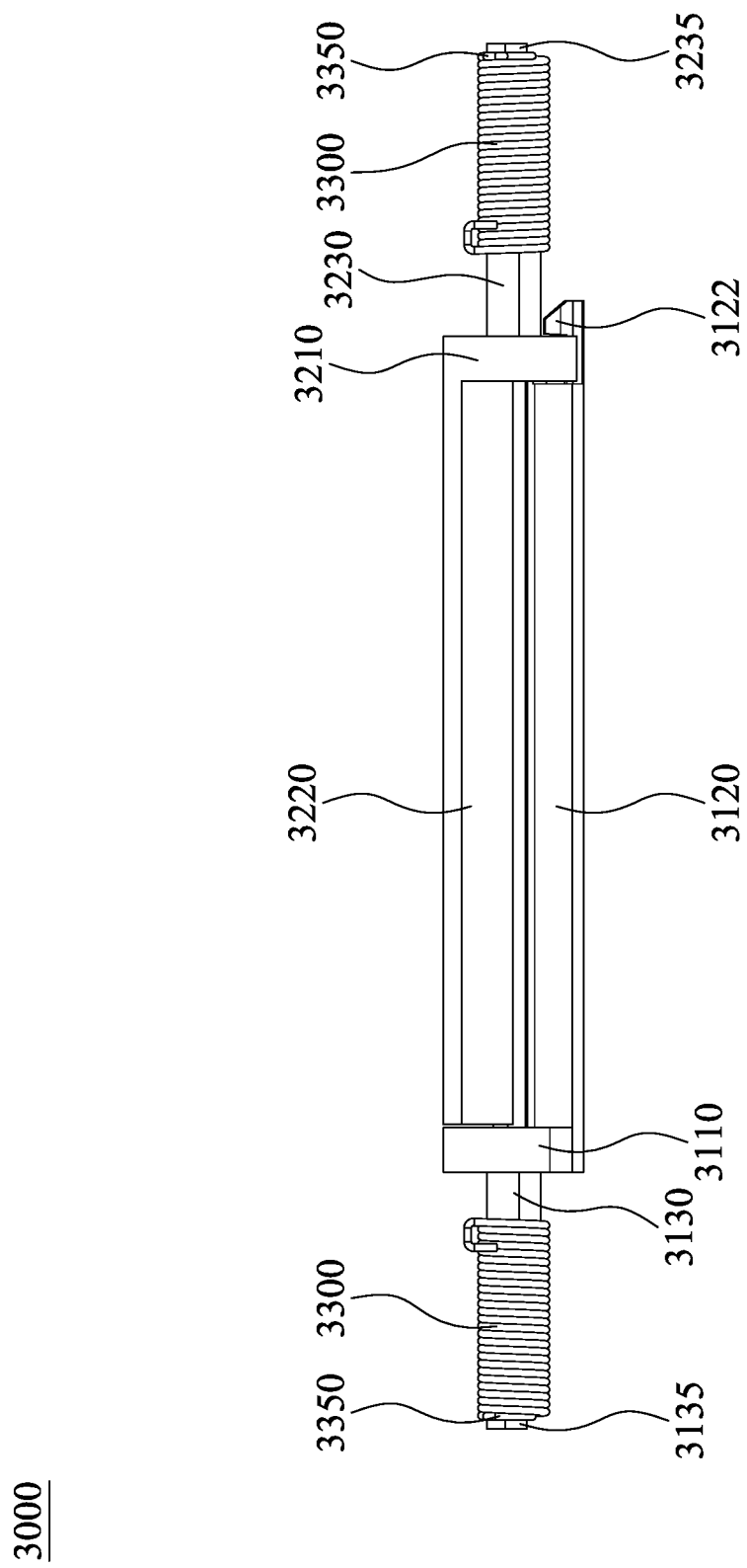
FIG. 7 illustrates a front view of the assembled first tube, second tube, and first resilient elements, according to some embodiments of the present disclosure.

Referring to FIGS. 5 to 7, FIG. 5 illustrates a front view and a side view of the first tube 3100, according to some embodiments of the present disclosure. FIG. 6 illustrates a front view and a side view of the second tube 3200, according to some embodiments of the present disclosure. FIG. 7 illustrates a front view of the assembled first tube 3100, second tube 3200, and first resilient elements 3300, according to some embodiments of the present disclosure.

As shown in FIG. 5, the first tube 3100 mainly includes a first base 3110, a first extension 3120, and a first extrusion 3130. The first base 3110 has a first outer surface 3111 and a first inner surface 3112 that is opposite to the first outer surface 3111. The first extension 3120 is connected to the first base 3110, and extends from the first inner surface 3112. The first extrusion 3130 is connected to the first base 3110 and extends from the first outer surface 3111.

As shown in FIG. 6, the second tube 3200 mainly includes a second base 3210, a second extension 3220, and a second extrusion 3230. The second base 3210 has a second outer surface 3211 and a second inner surface 3212 that is opposite to the second outer surface 3211. The second extension 3220 is connected to the second base 3210 and extends from the second inner surface 3212. The second extrusion 3230 is connected to the second base 3210 and extends from the second outer surface 3211.

In some embodiments, as shown in FIG. 7, the first inner surface 3112 of the first base 3110 and the second inner surface 3212 of the second base 3210 are facing each other. The first extension 3120 and the second extension 3220 are disposed between the first base 3110 and the second base 3210. In some embodiments, the first extension 3120 is connected to the second base 3210, and the second extension 3220 is connected to the first base 3110, so that the first tube 3100 and the second tube 3200 are engaged.

Specifically, in some embodiments, the first tube 3100 has a first locating hole 3113 on the first inner surface 3112 of the first base 3110 (see FIG. 5), and the second tube 3200 has a first connecting portion 3221 on a first surface 3225 of the second extension 3220 (see FIG. 6), wherein the second extension 3220 is connected to the first base 3110 at the first surface 3225. Both the position and the shape of the first connecting portion 3221 correspond to those of the first locating hole 3113. Through the fitting of the first connecting portion 3221 and the first locating hole 3113 (e.g. the first connecting portion 3221 may be inserted into the first locating hole 3113), the first tube 3100 and the second tube 3200 are engaged.

Furthermore, in some embodiments, the second tube 3200 has a second locating hole 3213 on the second inner surface 3212 of the second base 3210 (see FIG. 6), and the first tube 3100 has a second connecting portion 3121 on a second surface 3125 of the first extension 3120 (see FIG. 5), wherein the first extension 3120 is connected to the second base 3210 at the second surface 3125. Both the position and the shape of the second connecting portion 3121 correspond to those of the second locating hole 3213. Through the fitting of the second connecting portion 3121 and the second locating hole 3213 (e.g. the second connecting portion 3121 may be inserted into the second locating hole 3213), the first tube 3100 and the second tube 3200 are further engaged.

In some embodiments, when the first tube 3100 and the second tube 3200 are engaged, the first connecting portion 3221 is inserted into the first locating hole 3113, and the second connecting portion 3121 is inserted into the second locating hole 3213. Meanwhile, the second surface 3125 of the first tube 3100 and the second inner surface 3212 of the second tube 3200 are in surface contact, and the first surface 3225 of the second extension 3220 and the first inner surface 3112 of the first tube 3100 are in surface contact.

Additionally, in some embodiments, the first tube 3100 further has a hook portion 3122 on the second surface 3125 of the first extension 3120 (see FIG. 5), wherein the first extension 3120 is connected to the second base 3210 at the second surface 3125. The second base 3210 further has a dented portion 3215 that is dented on its outer periphery (see FIG. 6). Both the position and the shape of the hook portion 3122 correspond to those of the dented portion 3215. Through the fitting of the hook portion 3122 and the dented portion 3215 (e.g. the hook portion 3122 may be hooked onto the dented portion 3215), the first tube 3100 and the second tube 3200 are further engaged. In some embodiments, the hook portion 3122 has a third surface 3123 that faces the second surface 3125 (see FIG. 5). When the first tube 3100 and the second tube 3200 are engaged, the third surface 3123 is in contact with the second outer surface 3211 of the second base 3210, as shown in FIG. 7.

In some embodiments, the first extrusion 3130 of the first tube 3100 may have a step portion 3135 (see FIG. 5), and the second extrusion 3230 of the second tube 3200 may have a step portion 3235 (see FIG. 6). Both the step portion 3135 and the step portion 3235 may be used to secure the end portions 3350 of the first resilient elements 3300. Specifically, as shown in FIG. 7, the plurality of the first resilient elements 3300 (e.g. two first resilient elements 3300) may be sleeved onto the first extrusion 3130 and the second extrusion 3230. In this configuration, each end portion 3350 of the first resilient elements 3300 may be respectively affixed to the step portion 3135 and the step portion 3235, thereby the first resilient elements 3300 may be affixed to the first tube 3100 and the second tube 3200.

Referring to FIGS. 8A to 8G, FIGS. 8A to 8G respectively illustrate schematic views of the assembling process of the cable arrangement mechanism 3000, the FPC 2200 and the pivot cover 2130, according to some embodiments of the present disclosure.

Figure 8A:
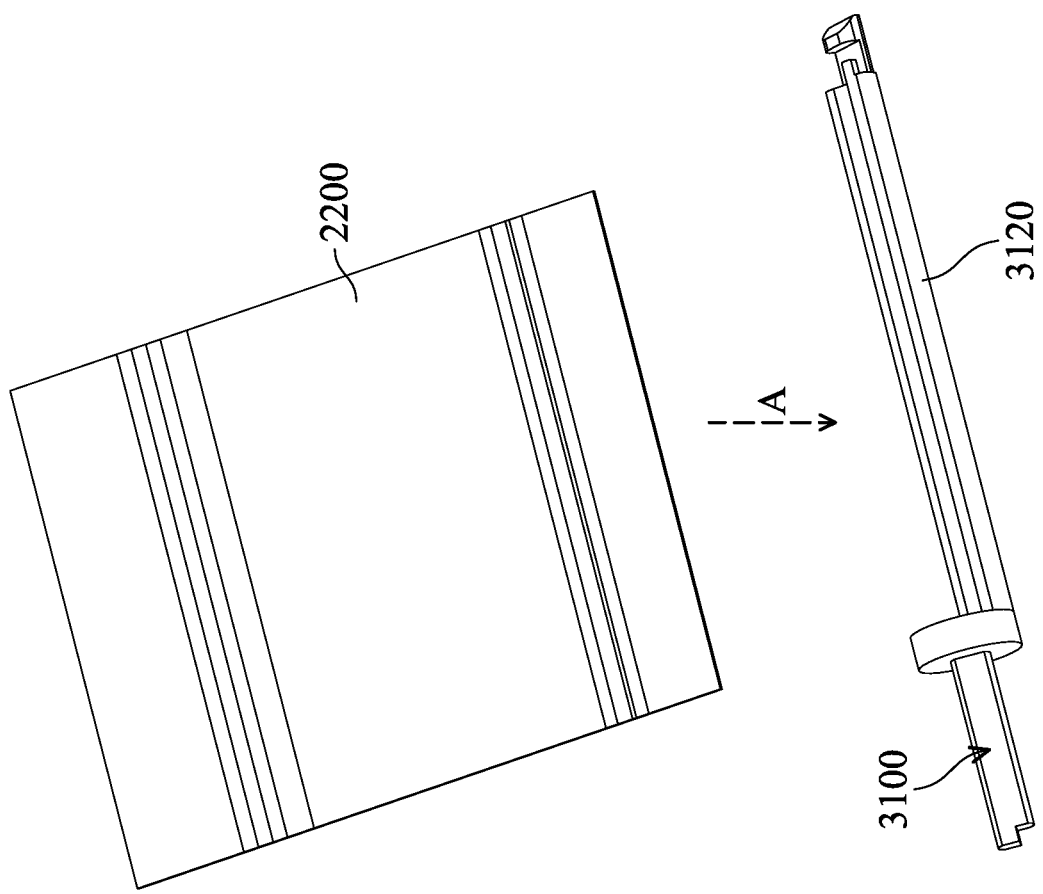
FIGS. 8A to 8G respectively illustrate schematic views of the assembling process of the cable arrangement mechanism, the flexible printed circuit and the housing, according to some embodiments of the present disclosure.

In FIG. 8A, it starts by placing the FPC 2200 above the first extension 3120 of the first tube 3100 along the direction of arrow A. At this point, the first tube 3100 is not assembled with the second tube 3200, first resilient elements 3300, or the pivot cover 2130 yet. In some embodiments, the length of the first extension 3120 is designed to match the width of the FPC 2200, but it may also depend on user requirements.

Figure 8B:
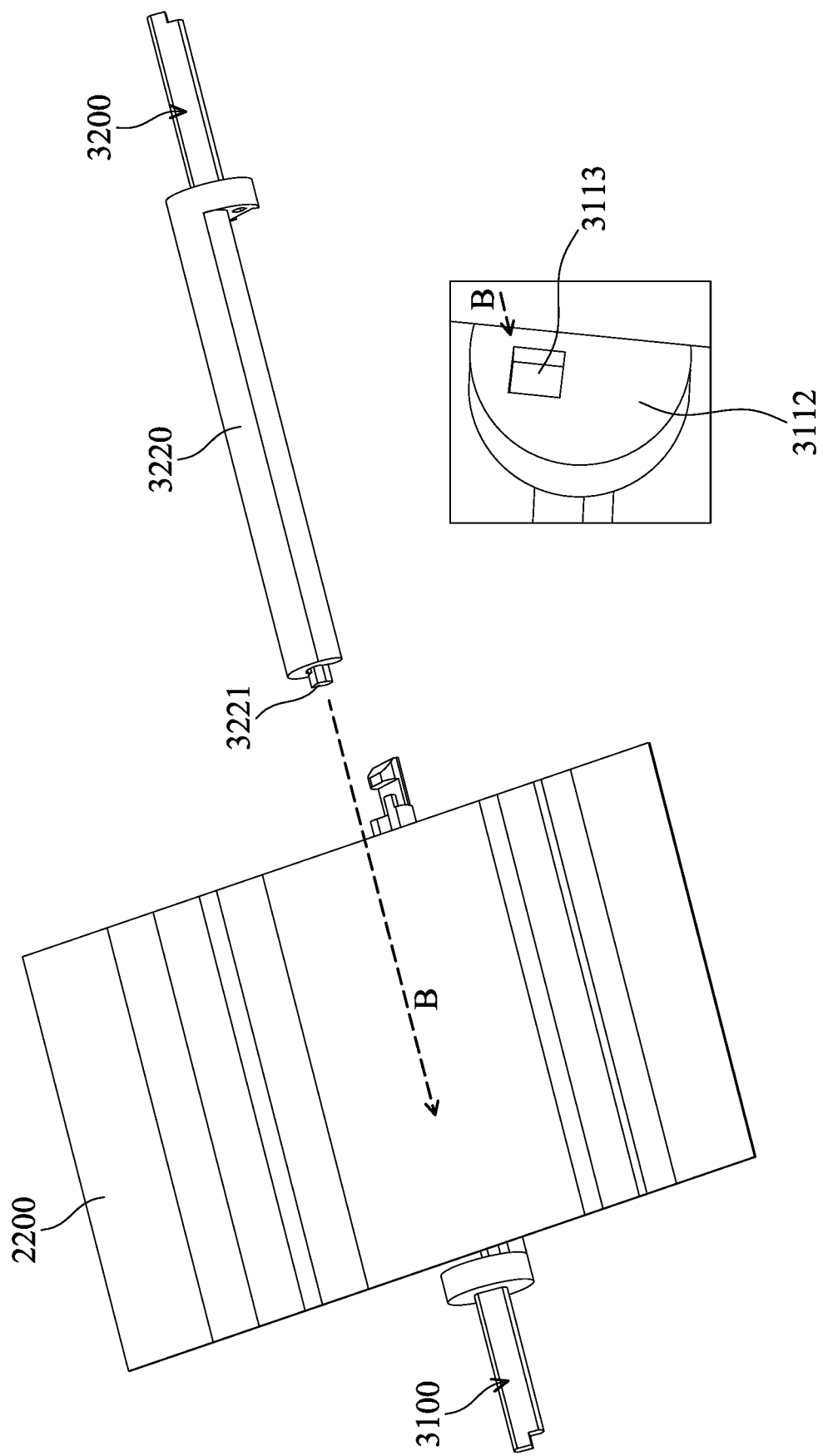

In FIG. 8B, the FPC 2200 is already disposed on the first tube 3100. Next, the second tube 3200 is moved along the direction of arrow B, so that the first connecting portion 3221 at the front end of the second extension 3220 is aligned with the first locating hole 3113 on the first inner surface 3112. The second tube 3200 continues to move until the first connecting portion 3221 is inserted into the first locating hole 3113. At this point, the FPC 2200 is held between the first extension 3120 of the first tube 3100 and the second extension 3220 of the second tube 3200.

Figure 8C:
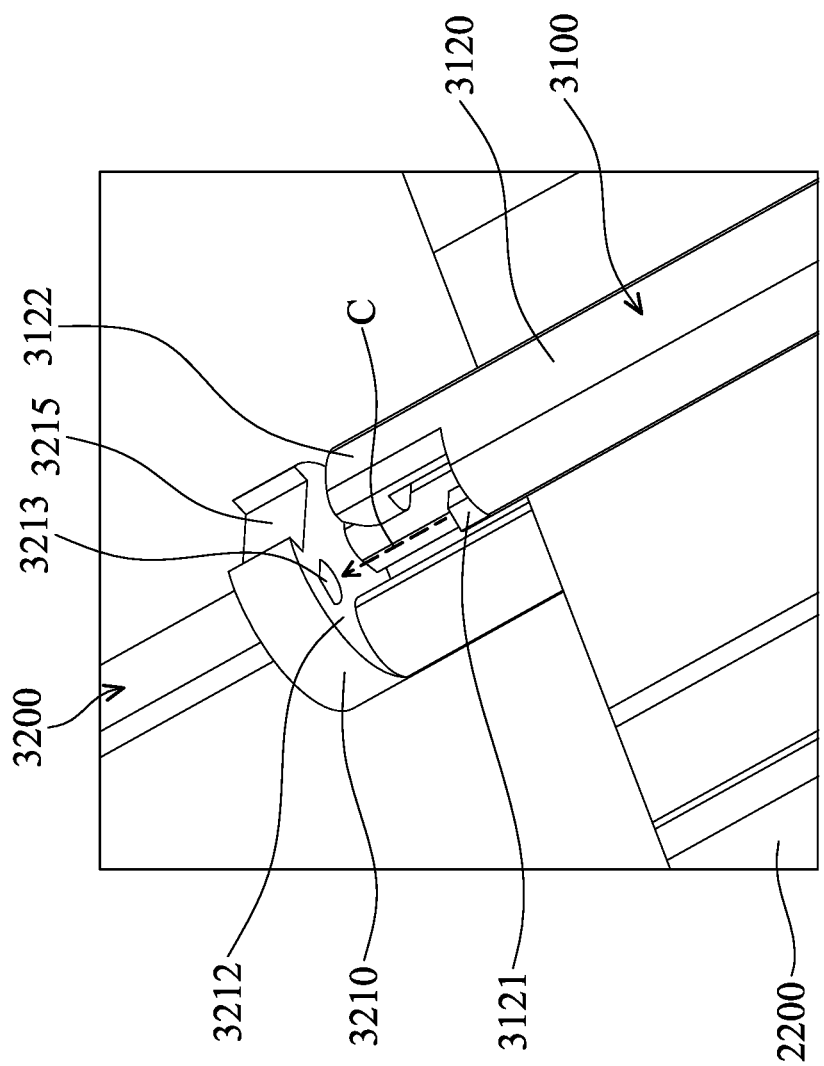

In the step shown in FIG. 8B, when the first connecting portion 3221 is aligned with the first locating hole 3113, the second connecting portion 3121 at the front end of the first extension 3120 also aligns with the second locating hole 3213 on the second inner surface 3212, as shown in FIG. 8C. In addition, the hook portion 3122 at the front end of the first extension 3120 also aligns with the dented portion 3215 of the second base 3210. In some embodiments, instead of moving the second tube 3200 along the direction of arrow B, the first tube 3100 may be moved along the direction of arrow C, until the second connecting portion 3121 is inserted into the second locating hole 3213 and the hook portion 3122 is hooked onto the dented portion 3215.

Figure 8D:
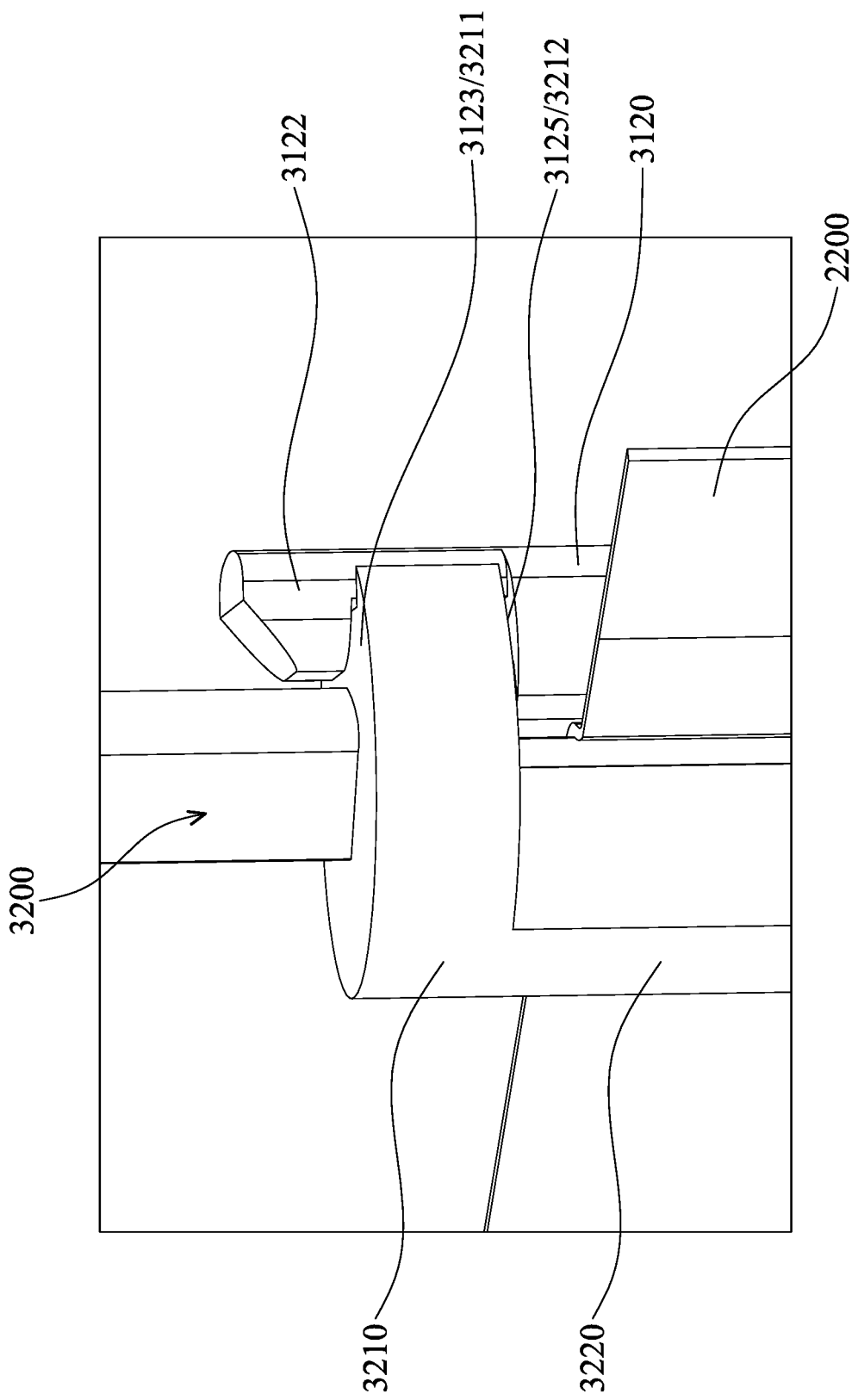

FIG. 8D shows a partial zoomed-in view near the second base 3210 when the first tube 3100 and the second tube 3200 are engaged. As mentioned above, when the first tube 3100 and the second tube 3200 are engaged, the second surface 3125 of the first extension 3120 is in contact with the second inner surface 3212 of the second base 3210, and the third surface 3123 of the hook portion 3122 is in contact with the second outer surface 3211 of the second base 3210.

Figure 8E:
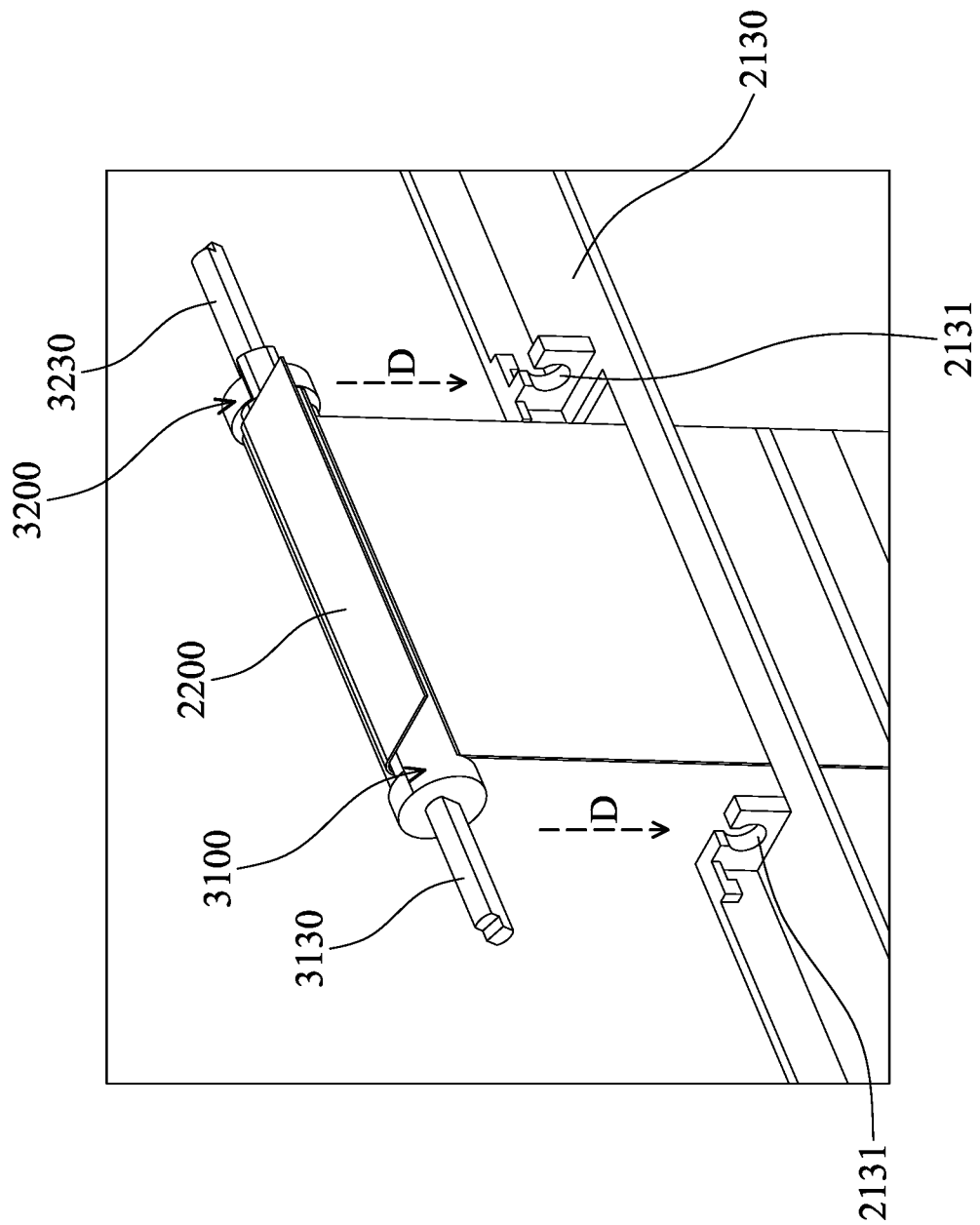

FIG. 8E shows a schematic view of assembling the engaged first tube 3100 and second tube 3200 with the pivot cover 2130. In some embodiments, the pivot cover 2130 includes a plurality of slots 2131. Both the positions and the shapes of the slots 2131 correspond to those of the first extrusion 3130 and the second extrusion 3230. The assembled first tube 3100 and second tube 3200 are moved along the direction of arrow D, until the first extrusion 3130 and the second extrusion 3230 are respectively placed into the corresponding slots 2131, so that the first tube 3100, the second tube 3200, and the pivot cover 2130 are connected together. It should be noted that the sizes of the slots 2131 are designed so that both the first extrusion 3130 and the second extrusion 3230 are rotatable within the slots 2131.

Figure 8F:
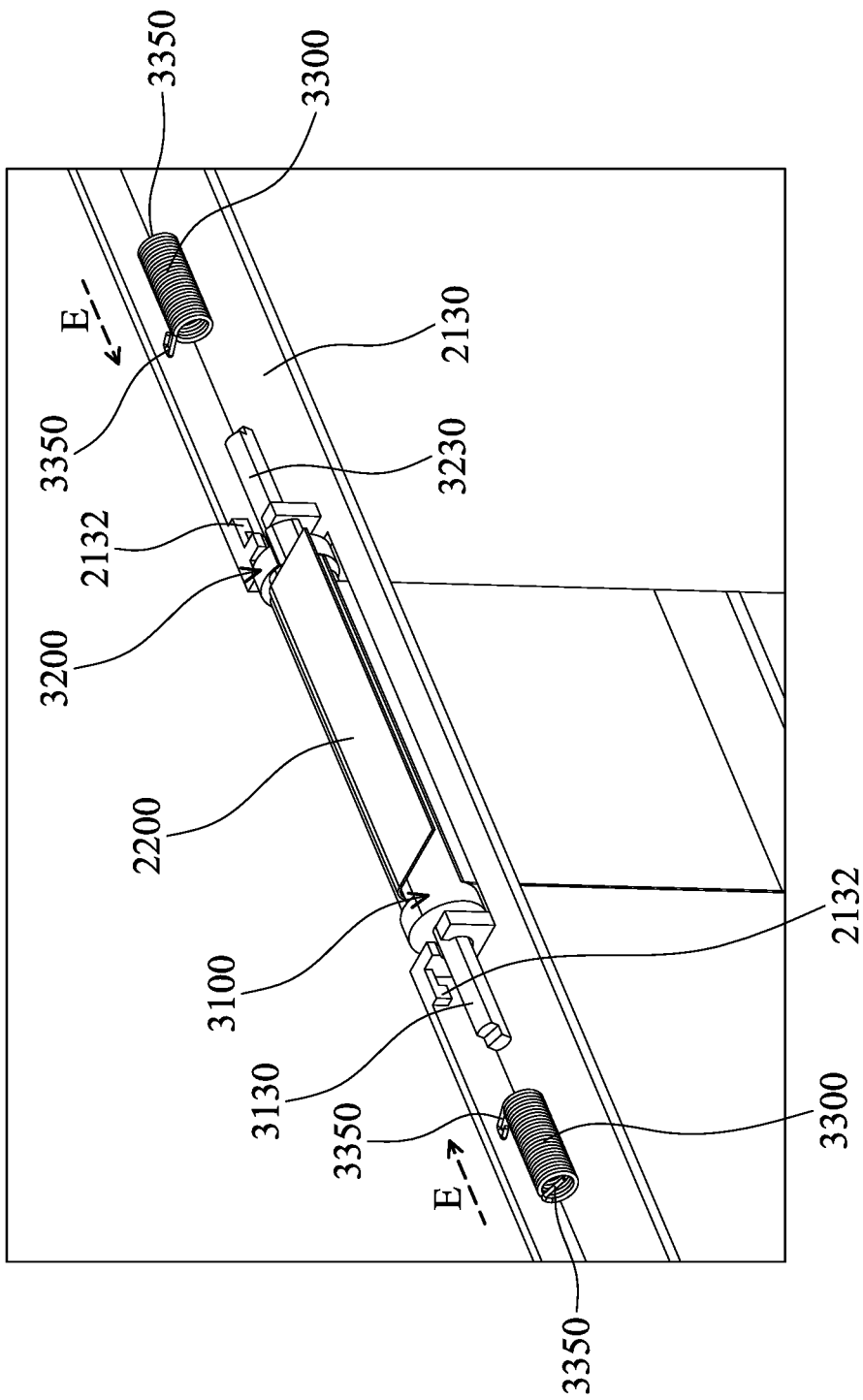

FIG. 8F shows a schematic view of assembling the first resilient elements 3300 after the first tube 3100, the second tube 3200 and the pivot cover 2130 are engaged. The first resilient elements 3300 are moved along the direction of arrow E, until the first resilient elements 3300 respectively sleeve onto the first extrusion 3130 and the second extrusion 3230. As mentioned above, when the first resilient elements 3300 are sleeved onto the first extrusion 3130 and the second extrusion 3230, each end portion 3350 of the first resilient elements 3300 (the end portion 3350 away from the FPC 2200) may be secured onto the step portion 3135 of the first extrusion 3130 and the step portion 3235 of the second extrusion 3230.

Figure 8G:
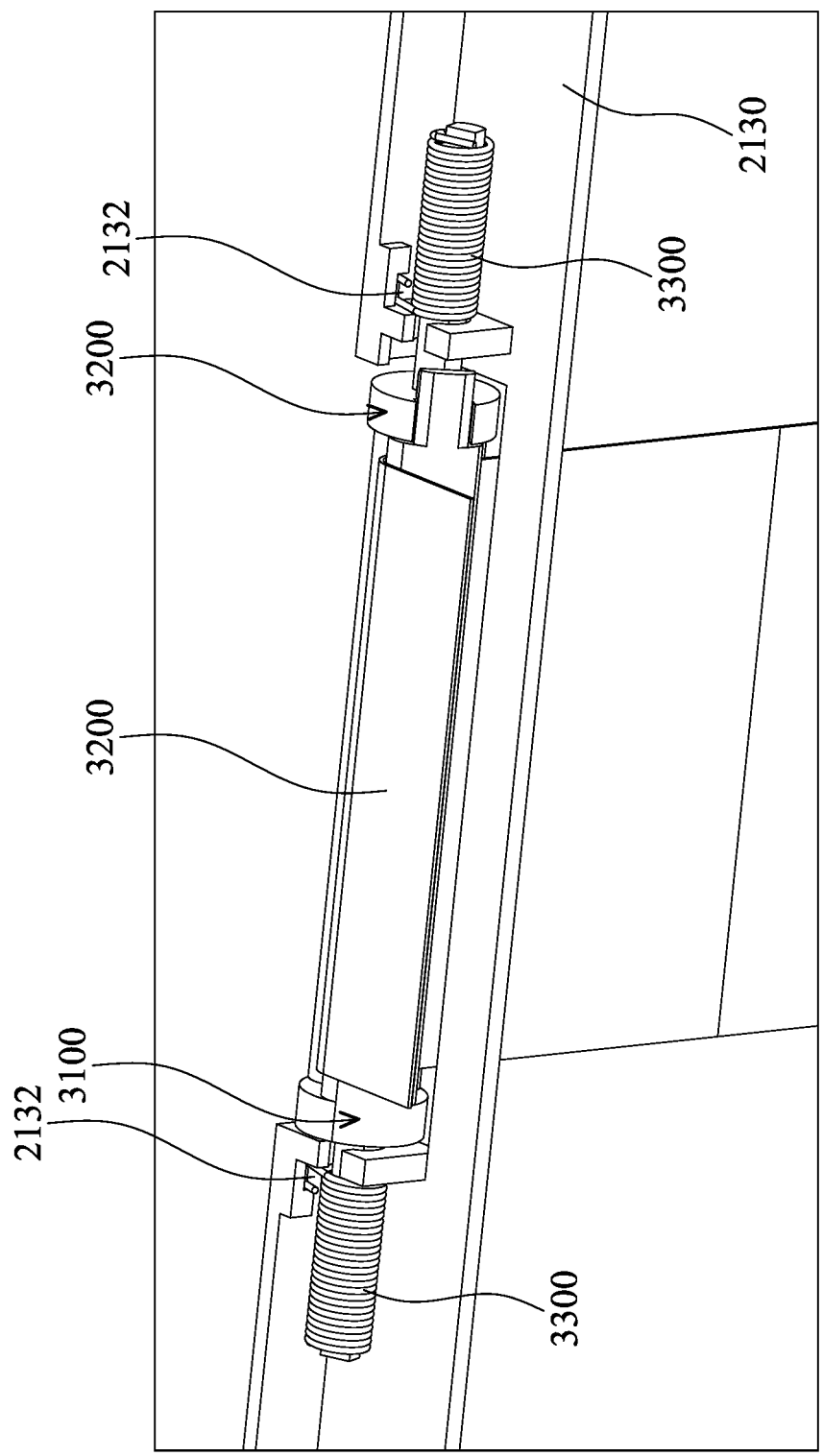

In some embodiments, the pivot cover 2130 includes a plurality of crooks 2132. Both the positions and the shapes of the crooks 2132 correspond to those of the end portions 3350 of the first resilient elements 3300 that are close to the FPC 2200. When the first resilient elements 3300 are sleeved onto the first extrusion 3130 and the second extrusion 3230, the end portions 3350 of each of the first resilient elements 3300 may be affixed to the crooks 2132, thereby securing at least part of the first extrusion 3130 and the second extrusion 3230 with the pivot cover 2130. Through the elastic restoring forces provided by the first resilient elements 3300, the engaged first tube 3100 and the second tube 3200 are rotatable reciprocally relative to the pivot cover 2130. FIG. 8G shows a schematic view of the completely assembled cable arrangement mechanism 3000, FPC 2200, and pivot cover 2130. FIG. 8G clearly shows the connection between the crooks 2132 and the first resilient elements 3300.

Figure 9A:
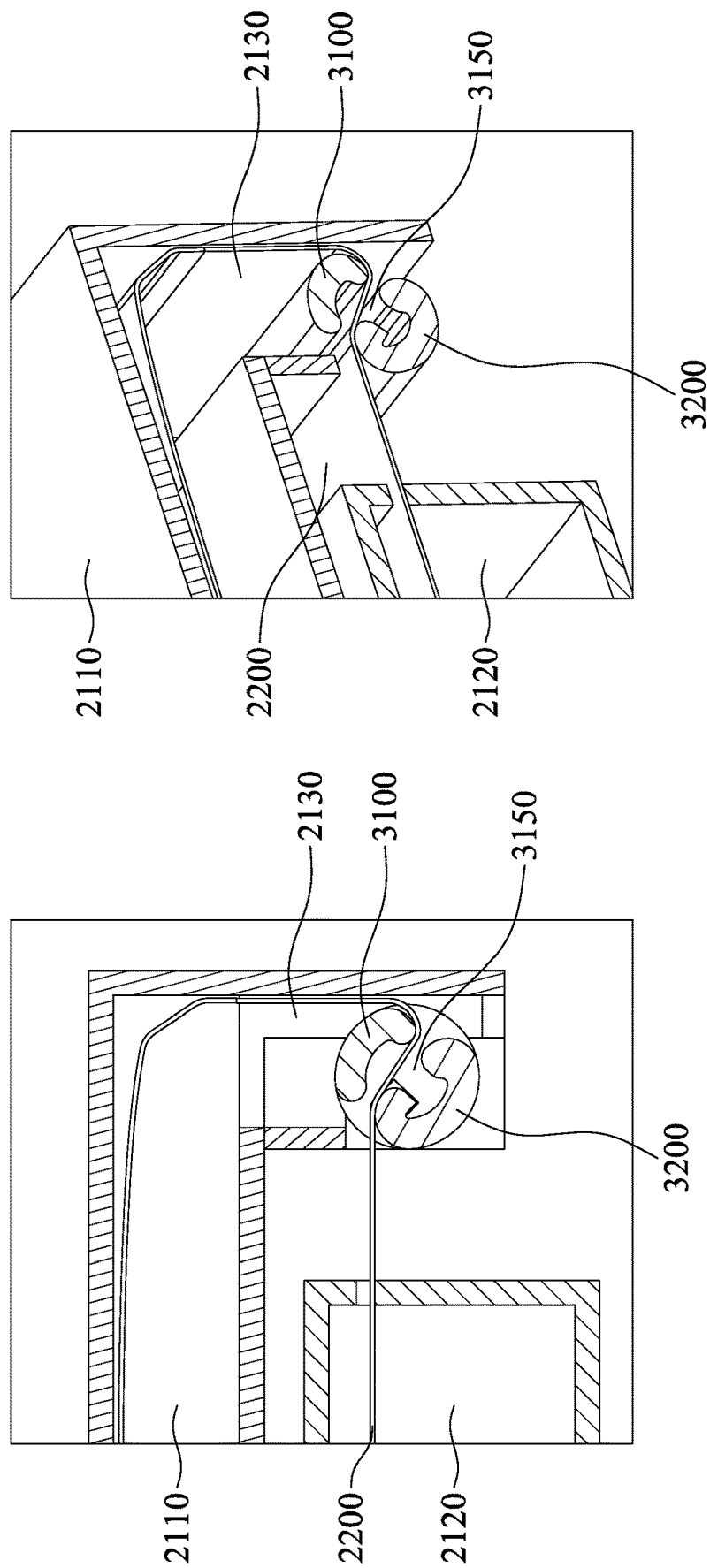
FIGS. 9A and 9B respectively illustrate a cross-sectional side view and a cross-sectional perspective view of the assembled cable arrangement mechanism, flexible printed circuit, and housing in the closed state and the open state, according to some embodiments of the present disclosure.
Figure 9B:
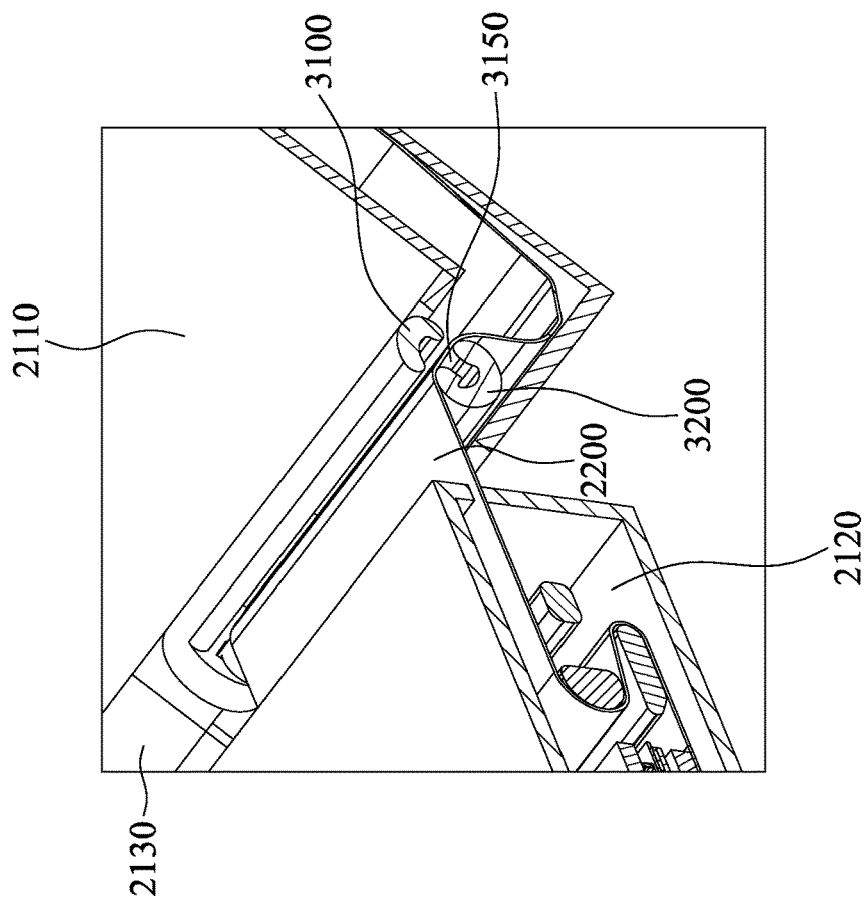
Figure 9B:
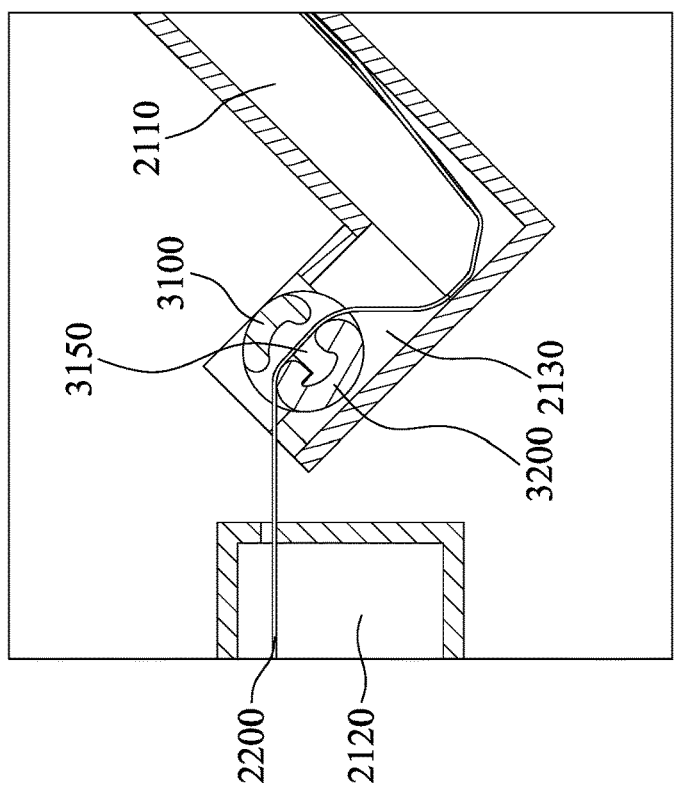

Referring to FIGS. 9A and 9B, FIGS. 9A and 9B respectively illustrate a cross-sectional side view and a cross-sectional perspective view of the assembled cable arrangement mechanism 3000, FPC 2200, and housing 2100 in the closed state and the open state, according to some embodiments of the present disclosure. As shown in FIGS. 9A and 9B, the pivot cover 2130 that is connected to the upper housing 2110 has an opening that is close to the lower housing 2120. The first tube 3100 and the second tube 3200 may be partially exposed through this opening. Moreover, the FPC 2200 leaves the upper housing 2110 via this opening and then enters the lower housing 2120. As shown in FIGS. 9A and 9B, an accommodating space 3150 may be formed between the first tube 3100 and the second tube 3200. Specifically, an accommodating space 3150 may be formed between the first extension 3120 of the first tube 3100 and the second extension 3220 of the second tube 3200. The FPC 2200 extends from the upper housing 2110, passes through the accommodating space 3150, and enters the lower housing 2120.

Advantageously, as the cable arrangement mechanism 3000 rotates, when the upper housing 2110 opens and closes, the FPC 2200 is movable relative to the housing 2100, so that the height where the FPC 2200 leaves the upper housing 2110 stays the same (e.g. maintains at the same height as where it enters the lower housing 2120). As a result, the height difference S may be significantly reduced, so that the height difference S is close to zero. This effectively prevents the FPC 2200 from being breaking or damaged.

Figure 10:
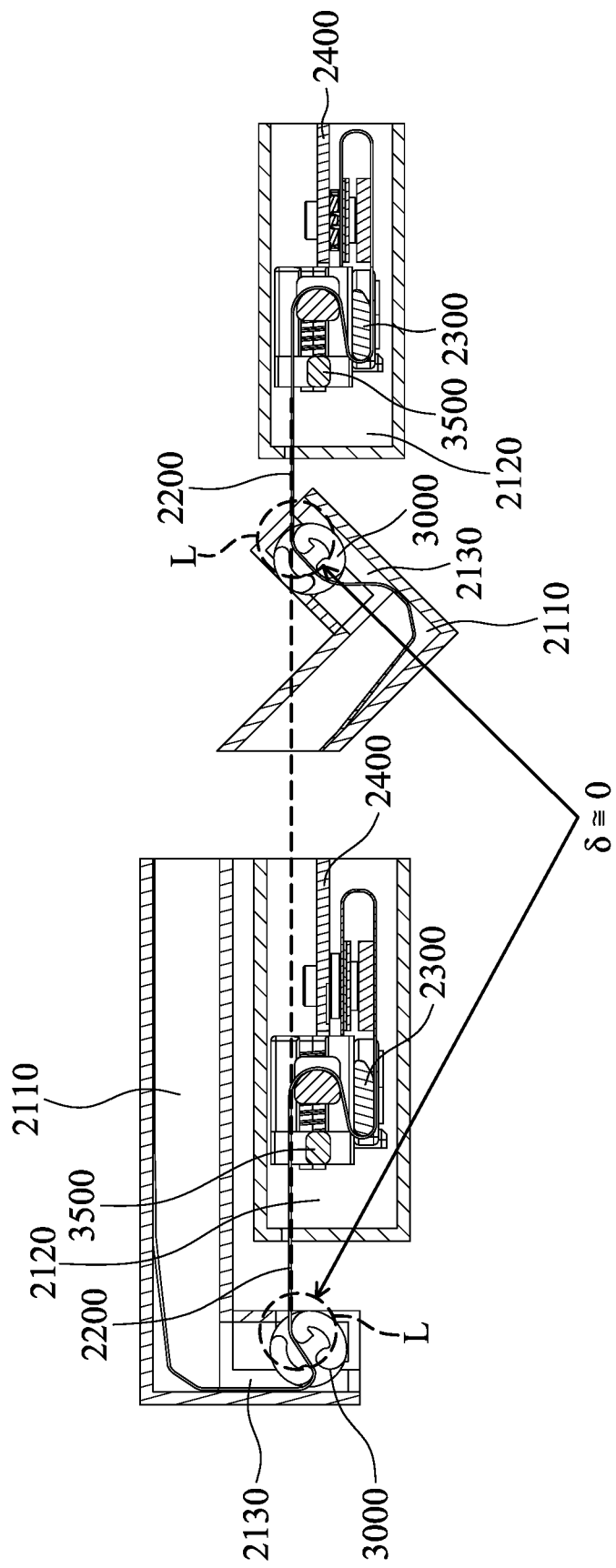
FIG. 10 illustrates a cross-sectional side view of the assembled cable arrangement mechanism, flexible printed circuit, and housing with a cable-collecting device in the closed state and the open state, according to some embodiments of the present disclosure.

FIG. 10 illustrates a cross-sectional side view of the assembled cable arrangement mechanism 3000, FPC 2200, and housing 2100 with a cable-collecting device 3500 in the closed state and the open state, according to some embodiments of the present disclosure. In some embodiments, the cable arrangement mechanism 3000 further includes a cable-collecting device 3500 that is disposed at the lower housing 2120. As shown in FIG. 10, the FPC 2200 passes through the first tube 3100 and the second tube 3200 that are rotatable relative to the housing 2100, leaves the pivot cover 2130 from the outlet L, and enters the lower housing 2120. After the FPC 2200 enters the lower housing 2120, it passes through the cable-collecting device 3500 and the support member 2300, and then electrically connects with the printed circuit board assembly (PCBA) 2400. When the upper housing 2110 opens and closes repeatedly, the position of the outlet L of the FPC 2200 substantially stays unchanged. This significantly reduces the height difference S, so that the height difference S is close to zero. As a result, this not only reduces the risk of breaking the FPC 2200 due to repeated bending, but also reduces the stroke that the cable-collecting device 3500 requires. This is advantageous for mechanism miniature. The detailed structure of the cable-collecting device 3500 will be described below.

Figure 11:
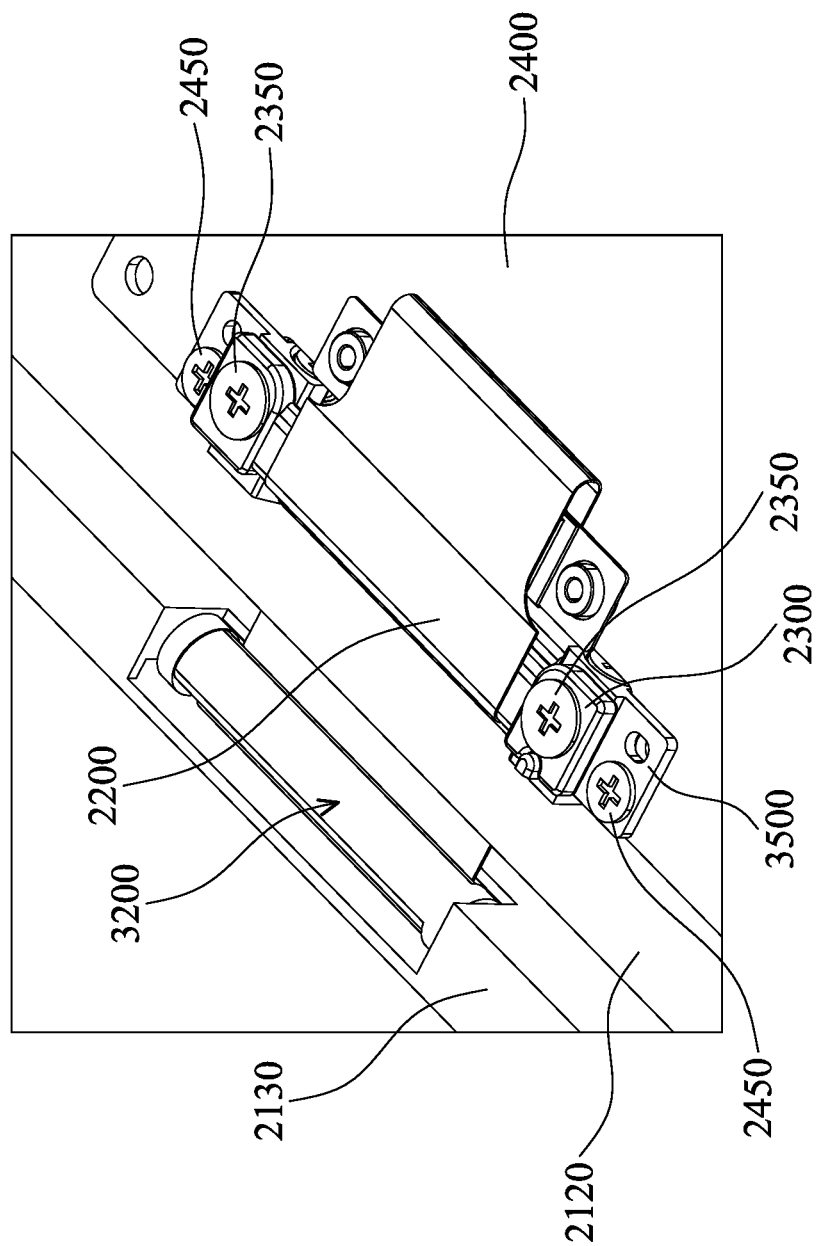
FIG. 11 illustrates a bottom perspective view of the cable-collecting device assembled onto the housing, according to some embodiments of the present disclosure.

FIG. 11 illustrates a bottom perspective view of the cable-collecting device 3500 assembled inside the lower housing 2120, according to some embodiments of the present disclosure, wherein the exterior walls of the lower housing 2120 are omitted to clearly show the inner structures. As shown in FIGS. 10 and 11, the cable-collecting device 3500 is disposed inside the lower housing 2120 and on the side of the lower housing 2120 that is close to the pivot cover 2130. It does not take up the volume of the lower housing 2120 in the vertical direction. This is helpful for thinning the mechanism, as it provides more space for other components. As shown in FIG. 11, the cable-collecting device 3500 is affixed onto the PCBA 2400 via a plurality of screw bolts 2450. In some embodiments, a support member 2300 may be secured on one side of the cable-collecting device 3500 via a plurality of screw bolts 2350. In the embodiments where the electronic device 2000 includes the support member 2300, the support member 2300 may provide extra accommodating space for the FPC 2200. As shown, after the FPC 2200 passes through the cable-collecting device 3500, it may wind through the support member 2300, and then electrically connects to the PCBA 2400 via one or more connectors.

Figure 13:
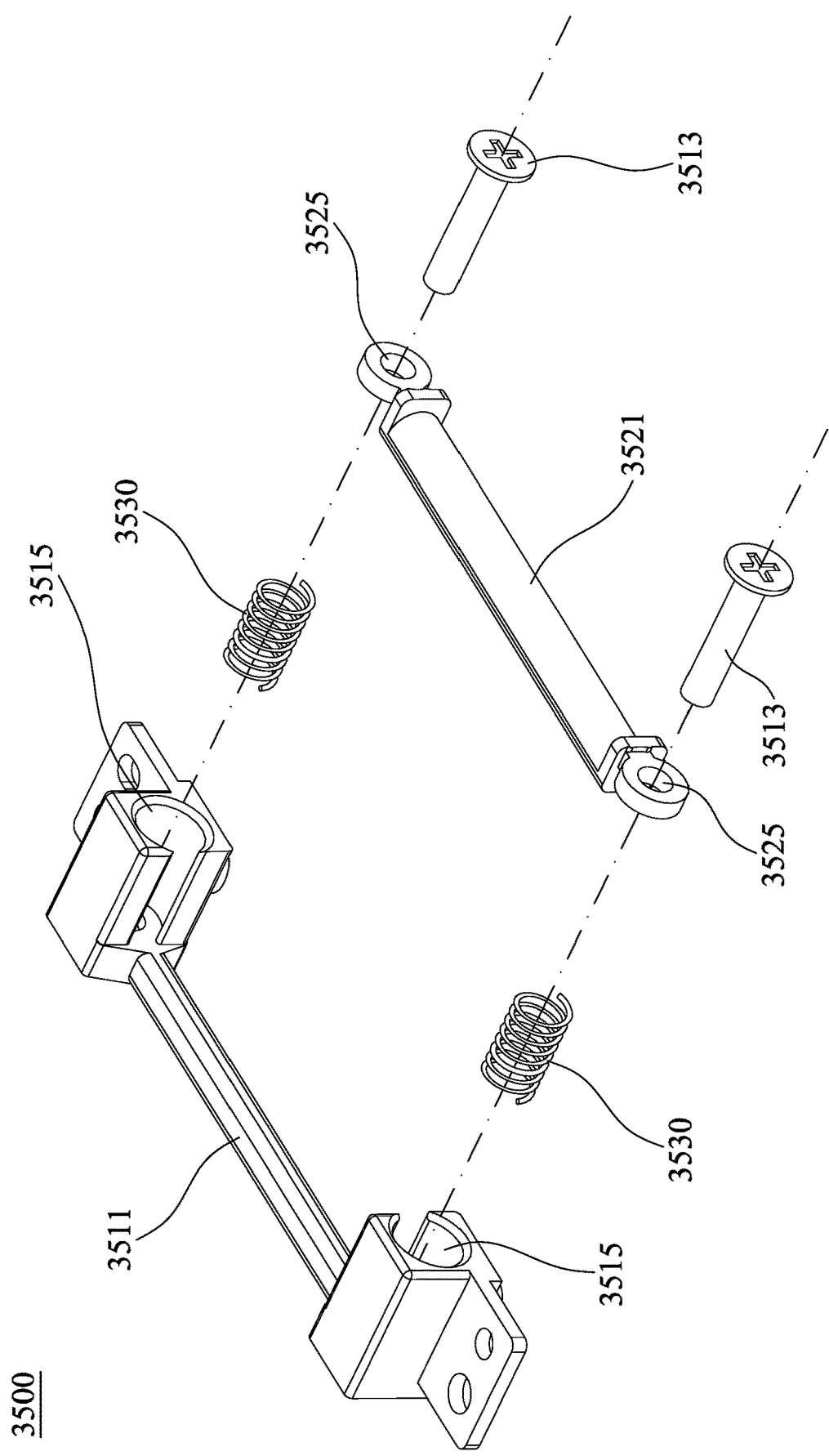
FIG. 13 illustrates an exploded view of the cable-collecting device, according to some embodiments of the present disclosure.

Referring to FIGS. 12A, 12B, and 13, which respectively illustrate a front view, a top view, and an exploded view of the cable-collecting device 3500 according to some embodiments of the present disclosure. As shown, the cable-collecting device 3500 mainly includes a fixed portion 3510, a cable-winding rod 3520, and a plurality of second resilient elements 3530. As mentioned above, the fixed portion 3510 may be affixed to the PCBA 2400 via a plurality of screw bolts 2450. Since the PCBA 2400 is affixed inside the housing 2100, the fixed portion 3510 is indirectly affixed to the housing 2100. The cable-winding rod 3520 is slidable relative to the fixed portion 3510, e.g. along the vertical direction in FIG. 12B. The plurality of second resilient elements 3530 provide the elastic restoring forces for the cable-winding rod 3520 to slide relative to the fixed portion 3510. The cable-winding rod 3520 is slidably connected to the fixed portion 3510 via the plurality of second resilient elements 3530.

Specifically, as shown in FIG. 12B, the fixed portion 3510 includes a rod structure 3511, and the cable-winding rod 3520 includes a rod structure 3521. The rod structure 3511 and the rod structure 3521 are parallel to each other. The extending directions of the rod structure 3511 and the rod structure 3521 are parallel to the extending direction of the first extension 3120 of the first tube 3100, and also parallel to the extending direction of the second extension 3220 of the second tube 3200.

As shown in FIG. 13, the fixed portion 3510 further includes a plurality of secure pins 3513. Each of the secure pins 3513 corresponds to one of the second resilient elements 3530, respectively. The cable-winding rod 3520 includes an opening 3525 on each end of the two opposite ends of the rod structure 3521. Each of the secure pins 3513 on the two opposite ends passes through one of the openings 3525 and one of the second resilient elements 3530. Moreover, the fixed portion 3510 includes an accommodating portion 3515 on each end of the two opposite ends of the rod structure 3511. The accommodating portions 3515 on the two opposite ends each accommodates the second resilient element 3530, the opening 3525 of the cable-winding rod 3520 and the secure pin 3513 that passes through the second resilient element 3530 and the opening 3525.

When the FPC 2200 wraps around the cable-winding rod 3520, as the upper housing 2110 opens and closes, the FPC 2200 brings the cable-winding rod 3520 to be closer to or further away from the rod structure 3511 of the fixed portion 3510, thereby achieving the release and collection of the cable. For example, referring to FIGS. 10 and 12B, when the upper housing 2110 is in the closed state, the FPC 2200 pulls the cable-winding rod 3520 toward the rod structure 3511, and the second resilient elements 3530 are compressed at this point. When the upper housing 2110 is in the open state, the FPC 2200 are released, so that the elastic forces of the second resilient elements 3530 make the cable-winding rod 3520 to move away from the rod structure 3511, returning to its initial position. It should be noted that the cable-winding rod 3520 requires a length of stroke that is significantly shorter than those of conventional cable-collecting devices, because the height of the outlet L of the FPC 2200 that is held by the first tube 3100, the second tube 3200, and the first resilient elements 3300 stays substantially unchanged. For example, the conventional cable-collecting devices may require a length of stroke that is longer than 5 mm, while the cable-collecting device 3500 of the present disclosure requires a length of stroke that is shorter than 3 mm.

Referring to FIGS. 11, 13, 14A, and 14B, FIGS. 14A and 14B respectively illustrate the schematic views of the assembly process of the cable-collecting device 3500, according to some embodiments of the present disclosure, wherein the exterior walls of the lower housing 2120 are omitted to clearly show the inner structures. The assembled cable-collecting device 3500 is shown in FIG. 11.

First, the secure pins 3513, the cable-winding rod 3520, and the second resilient elements 3530 are assembled into the accommodating portions 3515 of the fixed portion 3510 in the direction of the central axes of the two secure pins 3513 as shown in FIG. 13.

Figure 14A:
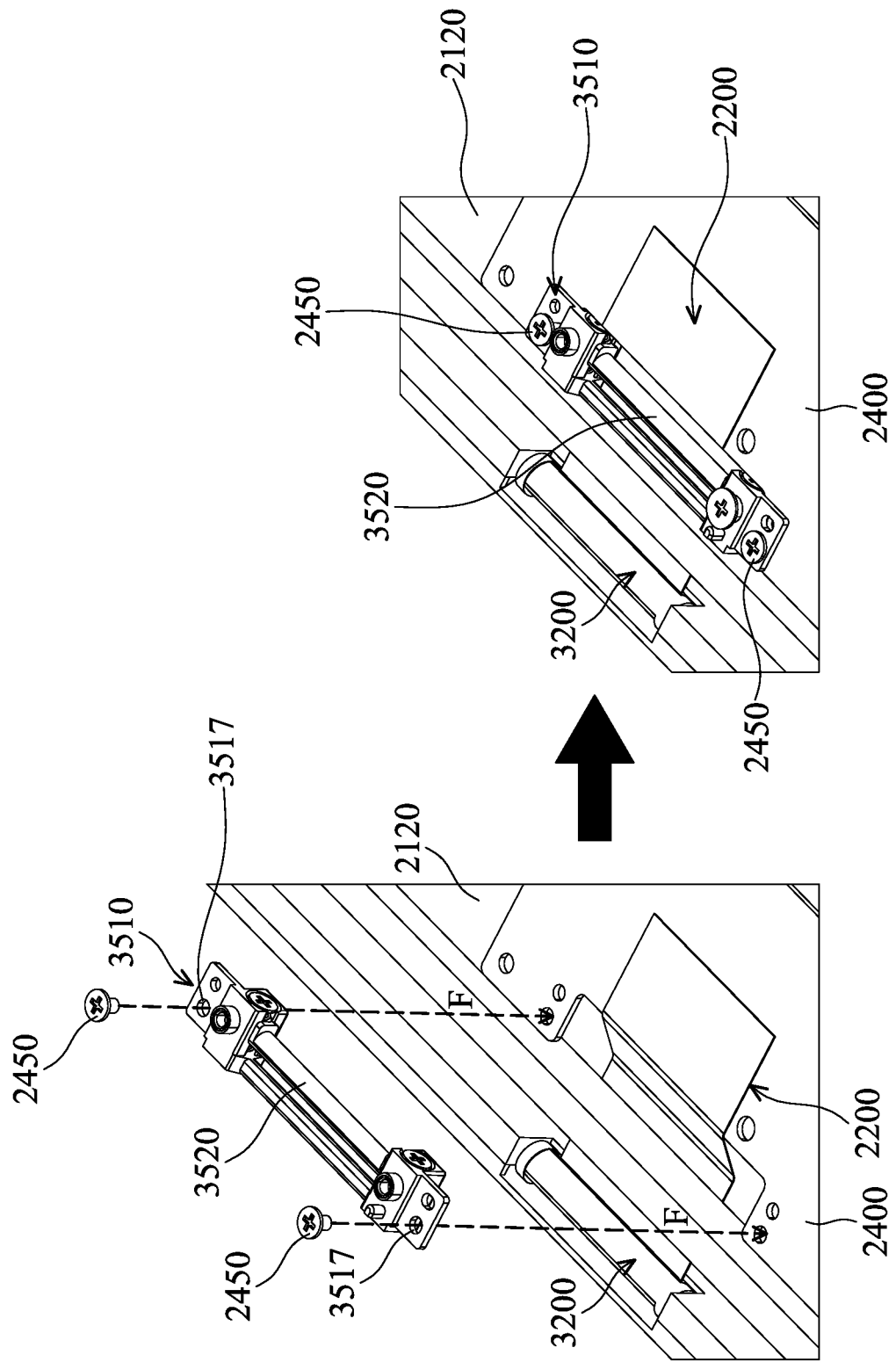
FIGS. 14A and 14B respectively illustrate the schematic views of the assembly process of the cable-collecting device, according to some embodiments of the present disclosure.

Next, as shown on the left side of FIG. 14A, the FPC 2200 may extends into the lower housing 2120 after passing through the first tube 3100 and the second tube 3200. Along the direction of arrow F, the openings 3517 on two opposite sides of the fixed portion 3510 are aligned with the holes on the PCBA 2400. Through the two screw bolts 2450 that pass through the openings 3517 and the PCBA 2400, the fixed portion 3510 is affixed onto the PCBA 2400, as shown on the right side of FIG. 14A.

Figure 14B:
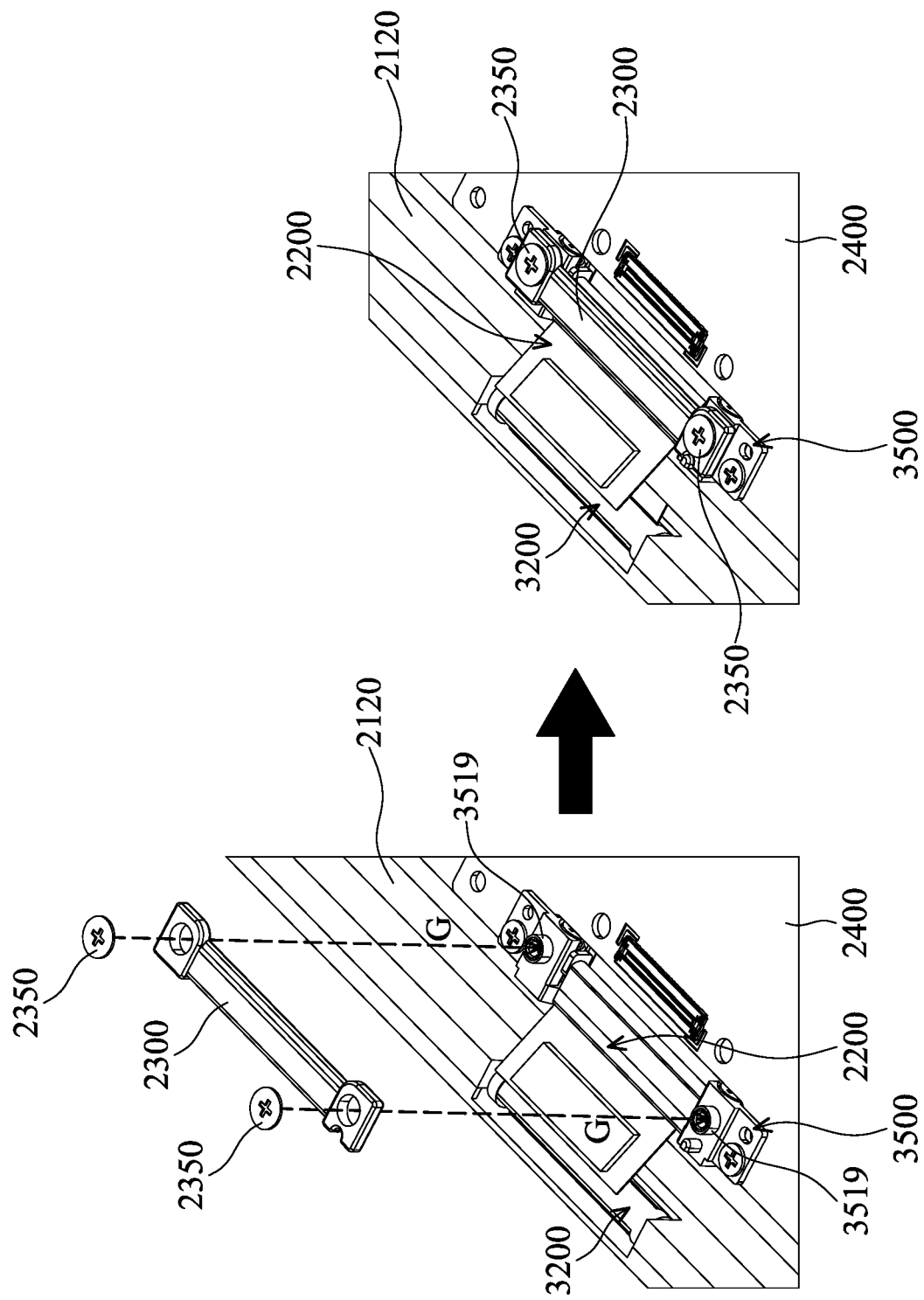

In some embodiments, the FPC 2200 may be folded toward the second tube 3200, so that the FPC 2200 covers the top of the fixed portion 3510, as shown on the left side of FIG. 14B. At this point, along the direction of arrow G, the holes on the support member 2300 are aligned with the threaded holes 3519 on two opposite sides of the fixed portion 3510. Through the two screw bolts 2350 that pass through the support member 2300 and the threaded holes 3519, the support member 2300 is affixed onto the fixed portion 3510, as shown on the right side of FIG. 14B.

At last, the FPC 2200 is folded toward a direction that is away from the second tube 3200, so that the FPC 2200 covers the top of the support member 2300. As such, the FPC 2200 may be electrically connected to the PCBA 2400 and/or one or more connectors between the FPC 2200 and the PCBA 2400, as shown in FIG. 11.

In summary, through the configuration of the cable arrangement mechanism (e.g. a cable arrangement mechanism 3000 that includes at least the first tube 3100, the second tube 3200, and the first resilient elements 3300) in accordance with the present application, the position of the outlet L of the FPC 2200 substantially stays unchanged when the upper housing 2110 of the electronic device 2000 opens and closes repeatedly, so that the height difference S is close to zero. As a result, the risk of breaking the FPC 2200 may be reduced, and the required volume of the cable-collecting device 3500 may be reduced as well. This is advantageous for mechanism miniaturization.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. A cable arrangement mechanism, disposed inside a housing of an electronic device, comprising:
    a first tube, comprising:
        a first base, having a first outer surface and a first inner surface opposite to the first outer surface;
        a first extension, connected to the first base and extending from the first inner surface; and
        a first extrusion, connected to the first base and extending from the first outer surface;
    a second tube, comprising:
        a second base, having a second outer surface and a second inner surface opposite to the second outer surface;
        a second extension, connected to the second base and extending from the second inner surface; and
        a second extrusion, connected to the second base and extending from the second outer surface; and
    a plurality of first resilient elements, respectively connecting the first extrusion and the second extrusion to the housing, so that the first tube and the second tube are rotatably connected to the housing;
    wherein:
        the first inner surface and the second inner surface are disposed facing each other, and the first extension and the second extension are disposed between the first base and the second base;
        the first extension is connected to the second base and the second extension is connected to the first base, so that the first tube and the second tube are engaged; and
        an accommodating space is between the first extension and the second extension.

2. The cable arrangement mechanism as claimed in claim 1, wherein the first tube has a first locating hole on the first inner surface of the first base, and the second tube has a first connecting portion on a first surface of the second extension, wherein the second tube is connected to the first base at the first surface, wherein the first connecting portion corresponds to the first locating hole.

3. The cable arrangement mechanism as claimed in claim 2, wherein the second tube has a second locating hole on the second inner surface of the second base, and the first tube has a second connecting portion on a second surface of the first extension, wherein the first tube is connected to the second base at the second surface, wherein the second connecting portion corresponds to the second locating hole.

4. The cable arrangement mechanism as claimed in claim 3, wherein the first tube further has a hook portion on the second surface, wherein the first extension is connected to the second base at the second surface, and the second base further has a dented portion that is dented on its outer periphery, wherein the hook portion corresponds to the dented portion.

5. The cable arrangement mechanism as claimed in claim 4, wherein the hook portion has a third surface, facing the second surface and in contact with the second outer surface of the second base.

6. The cable arrangement mechanism as claimed in claim 1, wherein the first extrusion and the second extrusion each has a step portion for securing one of the ends of the first resilient elements.

7. The cable arrangement mechanism as claimed in claim 1, further comprising a cable-collecting device, wherein the cable-collecting device comprises:
    a fixed portion, fixedly connected to the housing;
    a cable-winding rod, slidable relative to the fixed portion; and
    a plurality of second resilient elements, wherein the cable-winding rod is slidably connected to the fixed portion via the second resilient elements.

8. The cable arrangement mechanism as claimed in claim 7, wherein the fixed portion and the cable-winding rod each comprises a rod structure, wherein the extending directions of the rod structures are parallel to the extending directions of the first extension and the second extension.

9. The cable arrangement mechanism as claimed in claim 8, wherein:
the fixed portion further comprises a plurality of secure pins, respectively corresponding to one of the second resilient elements, and each of the secure pins respectively passes through one of the second resilient elements; and
the cable-winding rod has an opening on each of the two opposite ends of the rod structure, wherein each of the secure pins respectively passes through one of the openings.

10. The cable arrangement mechanism as claimed in claim 9, wherein the fixed portion has an accommodating portion on each of the two opposite ends of the rod structure, for accommodating the openings of the cable-winding rod, the second resilient elements, and the secure pins.

* * * * *